(12) United States Patent
Li et al.

(10) Patent No.: US 11,076,082 B2
(45) Date of Patent: Jul. 27, 2021

(54) SYSTEMS AND METHODS FOR DIGITAL VIDEO STABILIZATION

(71) Applicant: SZ DJI OSMO TECHNOLOGY CO., LTD., Shenzhen (CN)

(72) Inventors: Xianggen Li, Shenzhen (CN); Li Zhou, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 33 days.

(21) Appl. No.: 16/195,447

(22) Filed: Nov. 19, 2018

(65) Prior Publication Data
US 2019/0132516 A1 May 2, 2019

Related U.S. Application Data

(63) Continuation of application No. PCT/CN2016/082916, filed on May 20, 2016.

(51) Int. Cl.
*H04N 5/232* (2006.01)

(52) U.S. Cl.
CPC .......... *H04N 5/232* (2013.01); *H04N 5/2329* (2013.01); *H04N 5/23254* (2013.01); *H04N 5/23258* (2013.01); *H04N 5/23267* (2013.01)

(58) Field of Classification Search
CPC ............ H04N 5/23258; H04N 5/2329; H04N 5/23267; H04N 5/232; H04N 5/23254
See application file for complete search history.

(56) References Cited

U.S. PATENT DOCUMENTS

| 2007/0165033 A1* | 7/2007 | Matsuno ............ H04N 7/18 345/475 |
| 2009/0219402 A1 | 9/2009 | Schneider |
| 2016/0088214 A1 | 3/2016 | Karttunen et al. |

(Continued)

FOREIGN PATENT DOCUMENTS

| CN | 1569563 A | 1/2005 |
| CN | 101296294 A | 10/2008 |
| CN | 101547360 A | 9/2009 |

(Continued)

OTHER PUBLICATIONS

The World Intellectual Property Organization (WIPO) International Search Report and Written Opinion for PCT/CN2016/082916 dated Feb. 16, 2017 7 pages.

*Primary Examiner* — Padma Haliyur
(74) *Attorney, Agent, or Firm* — Anova Law Group, PLLC

(57) ABSTRACT

An image processing method includes obtaining one or more sets of image data generated by an imaging sensor and one or more sets of positional data generated by one or more positional sensors. An individual set of image data is associated with an image timestamp based on a time at which the individual set of image data was generated. An individual set of positional data is associated with a positional timestamp based on a time at which the individual set of positional data was generated. The method further includes correlating one of the one or more sets of image data with a corresponding one of the one or more sets of positional data based on an image timestamp associated with the one of the one or more sets of image data and a positional timestamp associated with the corresponding one of the one or more sets of positional data.

17 Claims, 8 Drawing Sheets

(56) References Cited

U.S. PATENT DOCUMENTS

2018/0213153 A1\* 7/2018 Iso .................... H04N 5/23267

FOREIGN PATENT DOCUMENTS

| CN | 103424115 | A | 12/2013 |
| CN | 103426282 | A | 12/2013 |
| CN | 104679873 | A | 6/2015 |
| CN | 104903790 | A | 9/2015 |
| CN | 104918027 | A | 9/2015 |
| CN | 105373629 | A | 3/2016 |
| CN | 105438490 | A | 3/2016 |
| WO | 2014140355 | A1 | 9/2014 |
| WO | 2015022433 | A1 | 2/2015 |
| WO | 2015051501 | A1 | 4/2015 |

\* cited by examiner

SYSTEMS AND METHODS FOR DIGITAL VIDEO STABILIZATION

CROSS-REFERENCE TO RELATED APPLICATION

This application is a continuation of International Application No. PCT/CN2016/082916, filed on May 20, 2016, the entire contents of which are incorporated herein by reference.

BACKGROUND

Most digital cameras today can enable video capture. However, the image quality of the video may deteriorate when there is rapid relative movement between the camera and an imaged object. For example, rapid or high frequency movement of the camera during imaging, such as shaking or vibration, can cause video jittering. In addition, the use of a rolling shutter mechanism (common in many digital cameras) can exacerbate the above effect. Most digital cameras today use complementary metal oxide semi-conductor (CMOS)-based image sensors. A CMOS image sensor is typically activated by a rolling shutter (RS) mechanism, whereby each row of the CMOS image sensor is exposed sequentially during different time windows. Since pixels are acquired at different points in time, motion of either the camera or the imaged object may cause geometric distortion in the captured images. The geometric distortion may be exacerbated when the camera is coupled to a movable object, such as an unmanned aerial vehicle (UAV). Motion of the movable object may cause the resulting image to be tilted or skewed at an angle. In addition, vibration-induced changes to the angular orientation of the camera relative to the movable object can produce shifts in the field of view that impact image quality.

SUMMARY

A need exists to improve video quality by stabilizing the video and correcting for rolling shutter effect.

The present disclosure addresses the need and provides related advantages as well. The subject apparatuses and methods described herein provide compact, low cost, reliable, and integrated image stabilization systems that can be used for different imaging devices and under different environmental conditions, and can stabilize images substantially in real-time as the images are being captured.

In one aspect of the present disclosure, a stabilizing unit for stabilizing a payload is provided. The stabilizing unit may comprise: an actuator borne by a support, wherein the actuator is configured to control rotation of a payload about a single axis of rotation; and one or more processors borne by the support and individually or collectively configured to generate a signal communicated to the motor to effect control of the rotation of the payload based on positional information about the payload, wherein the support is coupled to the payload and a connector which in turn is coupled to a movable object and the support is a housing that encloses the actuator and the one or more processors.

In some embodiments, the connector utilized in the stabilizing unit is configured to be carried by a movable object. In some embodiments, the connector is configured to be directly coupled to a dampening element carried by the movable object. In some embodiments, the movable object can be an aerial vehicle, a land vehicle, a vehicle traversing water body, a mobile phone, a tablet, a laptop, a wearable device, or a digital camera.

In some embodiments, the support utilized in the stabilizing unit is a housing that is releasably coupled to the movable object. In some embodiments, the support is a separate piece from the connector while rotatably or rigidly coupled to the connector. In some embodiments, the support directly contacts the connector and/or the payload. In some embodiments, the support is rigidly or rotatably connected to the payload.

In some embodiments, the payload to be stabilized by the stabilizing unit comprises an imaging sensor that is configured to capture one or more images while the payload is in motion. In some embodiments, the payload is movable relative to the connector only about the single axis (e.g., roll axis) of rotation.

In some embodiments, the payload comprises an imaging sensor configured to capture an image, one or more positional sensors configured to measure the positional information of the payload, and one or more processors configured to process the image based on the positional information of the payload, wherein the positional information comprises rotation and acceleration about one or more axes. In some embodiments, the positional information utilized in the stabilizing unit is derived from one or more positional sensors such as accelerometer, gyroscope, compass and/or GPS. In some embodiments, the positional sensors are borne by the support where they include a single-axis accelerometer and a single-axis gyroscope that are rigidly coupled to the imaging sensor. Alternatively, the positional sensors are borne by the support, where they comprise a three-axis accelerometer and a three-axis gyroscope that are rigidly mounted to the imaging sensor. In this case, the axes of the positional sensors are orthogonal to the axes of the imaging sensor. In some embodiments, the processors utilized in the stabilizing unit are provided to stabilize a rotation of the payload about the roll axis. Thus, the processors are configured to receive the positional information about the payload, determine a rotational distortion of the imaging sensor about the single axis of rotation based on the positional information, and generate the signal to rotate the payload about the single axis of rotation to compensate the rotational distortion.

In another aspect of the disclosure, a method for stabilizing a payload is provided. The method may comprise: generating, with aid of one or more processors borne by a support, a signal to effect control of rotation of the payload about a single axis of rotation based on positional information about the payload; and controlling rotation of the payload with aid of an actuator borne by the support, wherein the motor is configured to control rotation of the payload about the single axis of rotation in response to the signal, wherein the support is coupled to the payload and a connector which in turn is coupled to a movable object.

According to another aspect of the disclosure, a method of correlating image data with positional data is provided. The method may comprise: obtaining one or more sets of image data derived from an imaging sensor configured to capture one or more images, wherein an individual set of image data is associated with an image timestamp based on a time at which the individual set of image data was derived; obtaining one or more sets of positional data derived from one or more positional sensors configured to measure positional state of the imaging sensor, wherein an individual set of positional data is associated with a positional timestamp based on a time at which the individual set of positional data was derived; and correlating, with aid of one or more processors, a set of image data with a corresponding set of positional data based on an associated image timestamp and an associated positional timestamp, wherein a rotational movement of the imaging sensor about a single axis is controlled by a stabilizing unit. In some embodiments, the image timestamp utilized in the correlating method is generated by the imaging sensor such that the timestamp is indicative of a time at which the associated set of image data is captured by the imaging sensor. Alternatively, the image timestamp can be generated by the one or more sensors such that the timestamp is indicative of a time at which the associated set of image data is received by the one or more processors.

In some embodiments, the positional timestamp is generated by the one or more positional sensors such that the positional timestamp is indicative of a time at which the associated positional data is measured. In some embodiments, the positional sensors comprise a gyroscope and an accelerometer to provide rotation and acceleration data of the imaging sensor about one or more axes. Alternatively, the positional timestamp can be generated by the one or more processors such that the timestamp is indicatively of a time at which the associated set of positional data is received by the one or more processors.

In some embodiments, the image data and positional data can be correlated with aid of one or more processors (gyroscope and accelerometer) based on the image timestamp and the corresponding positional timestamps. In some embodiments, there may be a constant time bias between the image timestamp and positional timestamp. In some embodiments, the correlating method further comprises eliminating gyroscope drift errors by applying a filter (e.g., Kalman or complimentary filter) to the one or more sets of positional data. The positional data can be a combination of gyroscope data and accelerometer data, a combination of compass data and accelerometer data, or a combination of gyroscope data, compass data and accelerometer data.

In some embodiments, the correlating method further comprises applying a low-pass filter to the one or more sets of positional data that are indicative of a positional state of the imaging sensor while capturing a set of image data. In some embodiments, the set of image data can be corrected based on the correlated set of positional data by determining a set of spatial correction data of the imaging sensor about one or more rotational axes and correcting the set of image data using the set of spatial correction data based on a transformation relationship between a motion of the imaging sensor and changes to the set of image data captured by the imaging sensor. In some embodiments, the set of spatial correction data is determined by applying one or more filters to the set of positional data correlated with the set of image data to generate a set of filtered data and comparing the set of positional data with the set of filtered data to generate the set of spatial correction data.

In some embodiments, the image data to be correlated in the correlating method corresponds to a group of pixels within a frame of image captured by the imaging sensor, the imaging sensor comprising a rolling shutter, and wherein a set of positional data correlated with the set of image data is indicative of a positional state of the imaging sensor while capturing the set of image data. In some embodiments, the positional data represents only a rotation motion of the imaging sensor. In some embodiments, the imaging sensor, the one or more processors, and the one or more positional sensors utilized in the correlating method are on-board a payload which is supported by a movable object.

In yet a separate but related aspect, the present disclosure provides an apparatus for correlating image data with positional data. The apparatus may comprise one or more processors that are, individually or collectively, configured to: obtain one or more sets of image data derived from an imaging sensor configured to capture one or more images, wherein an individual set of image data is associated with an image timestamp based on a time at which the individual set of image data was derived; obtain one or more sets of positional data derived from one or more positional sensors configured to measure positional state of the imaging sensor, wherein an individual set of positional data is associated with a positional timestamp based on a time at which the individual set of positional data was derived; and correlate, with aid of one or more processors, a set of image data with a corresponding set of positional data based on an associated image timestamp and an associated positional timestamp, wherein a rotational movement of the imaging sensor about a single axis is controlled by a stabilizing unit. In another aspect, of the disclosure, a method for processing image data is provided. The image processing method comprises: obtaining one or more sets of image data from an imaging sensor configured to capture one or more image frames; obtaining one or more sets of positional data from one or more positional sensors configured to measure a positional state of the imaging sensor; applying one or more filters to the one or more sets of positional data to generate one or more sets of filtered data; comparing the one or more sets of positional data with the one or more sets of filtered data to generate one or more sets of spatial correction data; and correcting the one or more sets of image data based on the spatial correction data.

In some embodiments, the image processing method further comprises correlating one or more sets of image data of an individual image frame with a set of positional data indicative of a positional state of the imaging sensor while capturing the individual image frame based on respective timestamps. In some embodiments, the image data are corrected using the spatial correction data that comprises a set of rotational correction angles of the imaging sensor about one or more rotational axes. In some embodiments, the correction angles are based on a transformation relationship between a motion of the imaging sensor and changes to image data captured by the imaging sensor. In some embodiments, the image data to be corrected correspond to an individual image frame or one or more groups of pixels within an individual image frame. In some embodiments, the one or more sets of image data captured by a rolling shutter imaging sensor are further corrected based on one or more motion characteristics of the imaging sensor. In some embodiments, the one or more sets of image data of the individual image frame are corrected using simultaneously (1) the spatial correction data and (2) the one or more motion characteristics of the imaging sensor.

In some embodiments, the one or more filters utilized in the image processing method comprise a complimentary filter and a low-pass filter, wherein the complimentary filter is applied to the one or more sets of positional data to generate one or more first sets of data, and the low-pass filter is applied to the one or more first sets of data to generate one or more second sets of data, and the spatial correction data are generated by comparing the first sets of data and the second sets of data. In some embodiments, the imaging sensor utilized in the processing method is configured to be supported by a stabilizing unit that is configured to be borne by a movable object, wherein the stabilizing unit is configured to control rotation of the imaging sensor about a roll axis of rotation relative to the movable object. In some embodiments, the stabilizing unit is configured to stabilize the imaging sensor by generating, generating, with aid of one or more processors borne by the stabilizing unit, a signal to effect control of rotation of the imaging sensor about a single axis of rotation relative to the movable object based on positional information about the imaging sensor, and controlling rotation of the imaging sensor with aid of an actuator borne by the stabilizing unit based on the signal. In some embodiments, the movable object can be an aerial vehicle, a land vehicle, a vehicle traversing water body, a mobile phone, a tablet, a laptop, a wearable device, or a digital camera.

In a separate yet related aspect, the present disclosure provides an apparatus for processing image data. The apparatus may comprise one or more processors that are, individually or collectively, configured to: obtain one or more sets of image data from an imaging sensor configured to capture one or more image frames; obtain one or more sets of positional data from one or more positional sensors configured to measure a positional state of the imaging sensor; apply one or more filters to the one or more sets of positional data to generate one or more sets of filtered data; compare the one or more sets of positional data with the one or more sets of filtered data to generate one or more sets of spatial correction data; and correct the one or more sets of image data based on the spatial correction data, wherein a rotational movement of the imaging sensor about a single axis is controlled by a stabilizing unit.

It shall be understood that different aspects of the disclosure can be appreciated individually, collectively, or in combination with each other. Various aspects of the disclosure described herein may be applied to any of the particular applications set forth below. Other objects and features of the present disclosure will become apparent by a review of the specification, claims, and appended figures. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Embodiments disclosed herein provide apparatuses and methods for image stabilization. It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

In one aspect, the present disclosure provides an apparatus for stabilizing a payload. In practicing, the stabilizing unit may stabilize a rotation of a payload about a single axis. The stabilizing unit may comprise: an actuator borne by a support; wherein the actuator is configured to control rotation of a payload about a single axis of rotation; and one or more processors borne by the support and individually or collectively configured to generate a signal communicated to the motor to effect control of the rotation of the payload based on positional information about the payload, wherein the support is coupled to the payload and a connector which in turn is coupled to a movable object.

In a separate yet related aspect, the present disclosure provides a method for stabilizing a payload. In practicing, the method may comprise: generating, with aid of one or more processors borne by a support, a signal to effect control of rotation of the payload about a single axis of rotation based on positional information about the payload; and controlling rotation of the payload with aid of an actuator borne by the support, wherein the motor is configured to control rotation of the payload about the single axis of rotation in response to the signal, wherein the support is coupled to the payload and a connector which in turn is coupled to a movable object.

Figure 1:
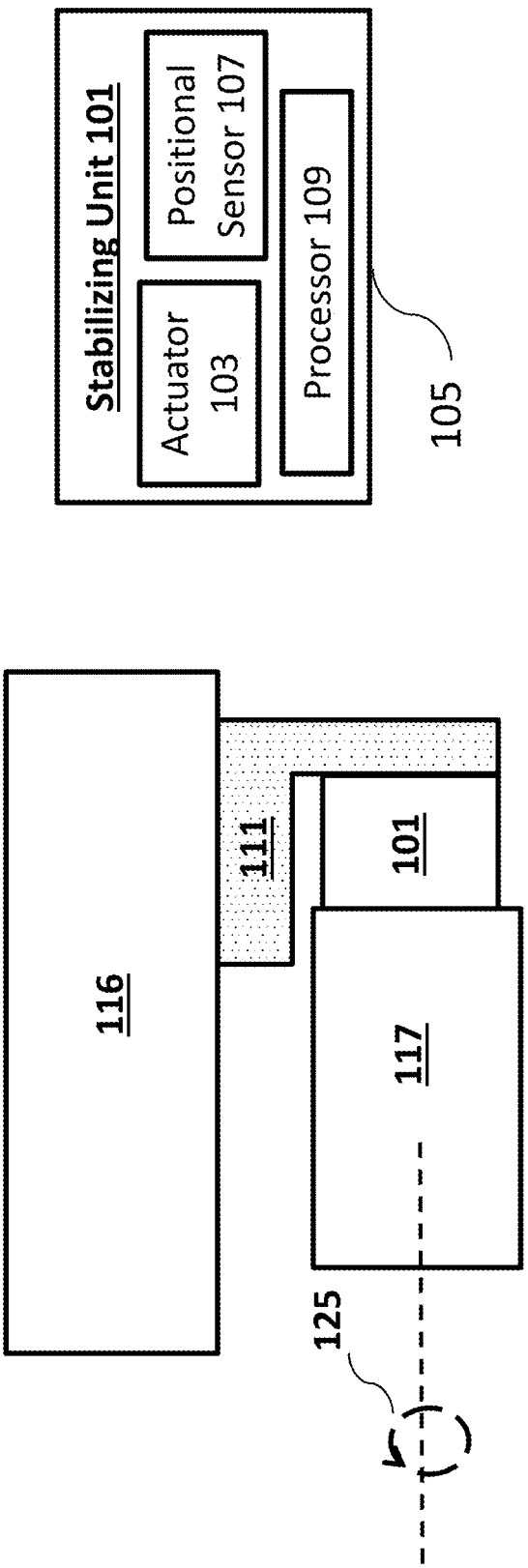
FIG. 1 is a block diagram of an exemplary system including a stabilizing unit for stabilizing a payload about a single rotation axis.

FIG. 1 is a block diagram of an exemplary system including a stabilizing unit for stabilizing a payload about a single rotation axis. In some embodiments, the stabilizing unit 101 may comprise an actuator 103 borne by a support 105. The actuator 103 can be any actuation mechanism that actuates rotation of a payload 117 about one or more axes (e.g., roll axis, pitch axis, or yaw axis). In some embodiments, the actuator may be a motor. In some embodiments, the motor may be configured to actuate the payload to rotate about a roll axis. In other embodiments, the motor may be configured to actuate the payload to rotate about a yaw or pitch axis.

The motor may be mechanically coupled to the payload to actuate rotation movement. Mechanical mechanism such as shafts, gears, adaptors, frames, connectors, fasteners, gimbal components and the like may be employed to transmit the actuation torque generated by the motor to the payload.

The motor may comprise moving parts. The motor may allow movement of the payload relative to the support. The motor may be a rotary actuator configured to produce a rotary motion or torque. A motor may comprise an automatic or machine-driven component such as an electric motor. In some instances, the motor may comprise a brushless motor. In some instances, the motor may comprise a servomotor. A servomotor may comprise a motor, a sensor, and a controller for precise control of the motor. A servomotor may comprise sensors (e.g., a hall sensor or a shaft encoder) to detect a position, speed, and/or acceleration of the motor. A controller may receive data (e.g., information) from the sensors and further control an angular position, velocity, acceleration and/or torque of the motor as desired. Alternatively or in combination, a motor may comprise a manually-manipulated component such as a lever, a handle, a knob, or a tilting mechanism. The payload may rotate in response to an actuation of the corresponding actuator (e.g., motor).

The motor may maintain or vary an orientation of the payload. For example, the actuator may receive an electronic signal (e.g., command) from a controller to actuate. The command to actuate may be received in response to human input. Alternatively or in conjunction, the command to actuate may be generated by the controller automatically without human interference.

The motor may actuate in response to the electronic signal. Actuation of the motor may directly drive the payload coupled to the actuator. Actuation of the motor may directly cause components directly coupled to the actuator to rotate about a longitudinal axis of the motor. Actuation of the motor may directly cause components indirectly coupled to the motor to rotate about an axis of the component (e.g., an axis of the payload which is not aligned with the motor axis). Directly connected as used herein may refer to the payload being connected to the motor without an intermediary component or structure, e.g., gimbal component, intermediary frame component, coupling plate, etc A direction of rotation (e.g., of the payload) may be clockwise. A direction of rotation (e.g., of the payload) may be counter-clockwise. The actuation may effect rotation of the payload in a clockwise direction or a counter-clockwise direction. For example, the motor may permit control of rotation of the payload about both a clockwise and counter-clockwise direction.

The motor's angular position (e.g., orientation), angular velocity, angular acceleration, and/or torque may be controlled. Correspondingly, the motor may be used to control an angular position and/or orientation, angular velocity, and an angular acceleration of components directly or indirectly coupled to the motor. In some instances, a controller may be provided to automatically or semi-automatically control parameters of the motor. In some instances, parameters of the actuator may be manually controlled. For example, a user may input desired parameters which may be relayed to a controller configured to control the actuators. For example, the user may manually control parameters of the actuators (e.g., manually actuate the actuators).

The position of the motor (e.g., and the corresponding frame and/or other components coupled thereto) may be controlled to within 0.05°, 0.1°, 0.5°, 1°, 2°, 5°, 10°, 20°, 30° of a desired position. The position of the motor (e.g., and the corresponding frame and/or other components coupled thereto) may be rotated to about 0°, 5°, 10°, 20°, 30°, 45°, 60°, 75°, 90°, 120°, 150°, 180°, 210°, 240°, 270°, 300°, 330°, or 360° relative to a resting position (e.g., in a clockwise or counter-clockwise direction). The position of the motor (e.g., and the corresponding frame and/or other components coupled thereto) may be rotated greater than about 0°, 5°, 10°, 20°, 30°, 45°, 60°, 75°, 90°, 120°, 150°, 180°, 210°, 240°, 270°, 300°, 330°, or 360° relative to a resting position (e.g., in a clockwise or counter-clockwise direction). The position of the motor (e.g., and the corresponding frame and/or other components coupled thereto) may be rotated less than about 0°, 5°, 10°, 20°, 30°, 45°, 60°, 75°, 90°, 120°, 150°, 180°, 210°, 240°, 270°, 300°, 330°, or 360° relative to a resting position (e.g., in a clockwise or counter-clockwise direction).

As illustrated in FIG. 1, the motor 103 may be borne by the support 105. In some embodiments, the support may be a housing that encloses at least the motor, one or more positional sensors 107, and one or more processors 109. The motor may be entirely within the housing or partially enclosed in the housing. Any material can be adopted to form the enclosing structure as long as it provides rigid support and connection to the motor and processors. The housing can be formed in any shape (e.g., cubic, spherical shell, etc). The support can be configured to carry at least the weight of the motor. In some instances, the motor may be rigidly fixed to the housing while movable with respect to the payload. In some instances, the motor can be releasably coupled to the support. Alternatively, the motor can be integrally formed with the support.

The support 105 is configured to be coupled to a connector 111. In some embodiments, the support is a separate piece from the connector and rotatably coupled to the connector. The support may be configured to be able to rotate about a single axis with respect to the connector. In some instances, the single axis may be aligned coaxially with a roll axis of a payload. The support may be configured to permit any degree of rotation of the payload about the roll axis (e.g., 5°, 10°, 15°, 45°, 90°, 180°, etc). In other embodiments, the support is a separate piece from the connector and rigidly coupled to the connector. The support may be rigidly fixed to the connector so that there is no relative movement between the support and the connector. In some embodiments, the support may be in direct contact with the connector. The support can be integrally formed with the connector. Alternatively, the support can be releasably coupled to the connector.

As shown in FIG. 1, the connector 111 may be configured to be carried by a movable object 116. In some embodiments, the connector is configured to be coupled to the movable object via a dampening element 113.

The movable object 116 may be an aerial vehicle, a land vehicle, a vehicle traversing water body, a mobile phone, a tablet, a laptop, a wearable device, or a digital camera. A movable object as described herein can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avians, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being. The movable object is not limited to any type of motion or vibration, such as high frequency, medium frequency and low frequency vibration resulted from any actuation system.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

As previously described, the connector may be coupled to the movable object via a dampening element (e.g., dampening element 113). The dampening element can mitigate the effect of motion of the movable object on the payload. The dampening element 113 as illustrated in FIG. 1 may be part of an intermediary connection between the connector and the movable object. In some embodiments, the dampening element may be a vibration dampening system. The vibration dampening system may be configured to isolate the connector and elements directly or indirectly connected to the connector (e.g., stabilizing unit, payload, etc) from the vibration motion of movable object. The vibration dampening system may be configured to reduce the effect of vibrations of the movable object on the connector. This may result in a greater than or equal to 10%, 20%, 30%, 40%, 50%, 60%, 70%, 80%, 90%, 95%, 99%, or 99.9% reduction. In some instances, the vibration dampening system may be configured to reduce or remove effects of high frequency vibrations of the vehicle (e.g., greater than 2 Hz, 3 Hz, 5 Hz, 10 Hz, 20 Hz, 30 Hz, 40 Hz, or 50 Hz), by any amount as described herein. The vibration dampening system may stabilize the stabilizing unit, the payload, and/or the movable object.

In some instances, the vibrational dampening system may comprise a plurality of elastomers configured to stabilize the payload, stabilizing unit, and/or the movable object. For example, one, two, three, four, five, six, seven, eight, nine, ten or more circular elastomers may be provided. The circular elastomers may connect the movable object to a rigid frame configured to directly connect to the connector. The vibrational dampeners may be used to support the connector as the term has been used throughout. For example, the vibrational dampeners may support a weight of the connector (e.g., and the payload). For example, the vibrational dampeners may hold the connector in place. In some instances, the vibrational dampening system may comprise springs. The vibrational dampeners may minimize vibrational motions (e.g., shaking) caused by operation of propulsion units of the movable device such as a UAV. For example, the vibrational dampeners may absorb vibrational energy generated (e.g., kinetic energy) and convert it to thermal energy, thereby stabilizing the system (e.g., UAV, stabilizing unit, and/or payload).

While the stabilizing unit is shown located below the movable object, systems and methods provided herein may be equally applicable to stabilizing unit located above or on a side of the movable object. The stabilizing unit disclosed herein may be mounted on an upper surface of the movable object, a lower surface of the movable object, on top of or below a central body of the movable object, on top of or below a peripheral portion of the movable object, and the like. While the stabilizing unit is shown located substantially near the center of the movable object, it is to be understood that the stabilizing unit may be located anywhere on the movable object (e.g., near the center, near the edge, etc.).

The stabilizing unit borne by the support may be configured to stabilize a payload (e.g., the payload 117 shown in FIG. 1).

A payload as used herein may refer to any part of a load or an object coupled to the stabilizing unit. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

The payload may comprise a single type of sensor, emitter, and/or tool. The payload may comprise multiple types of sensors, emitters, and/or tools. The payload may comprise any number and combination of sensors, emitters, and or tools described herein, e.g., sensor array.

The stabilizing unit described herein may permit stabilization of the payload. Stabilization may be required or beneficial while the payload is in motion. In some instances, the payload may be carried by a human being in motion (e.g., walking, in a vehicle, etc). In some instances, the payload may be coupled to a vehicle (e.g., UAV) that is in motion. As the payload is coupled to the movable object via a connector, any motion of the connector as an effect of the dampening element and the movable object may be transmitted to the payload.

In some embodiments, the payload 117 may comprise an imaging sensor configured to capture one or more images while the payload is in motion. Consequently, the imaging sensor may have motion according to the movement of the payload. Motion of the image device may include translational movement of the device, rotational movement of the device, curvilinear motion of the device, changing orientation (e.g., attitude, pitch, roll, yaw) of the device, zoom-in or zoom-out (magnification) of the lenses of the image device, or any combination of the above. In some cases, rapid motion of the image device (e.g., caused by movement of the movable object) may result in rolling shutter effect.

An imaging sensor as used herein may serve as an image capture device. An imaging device may make use of complementary metal oxide semiconductor (CMOS) sensors that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an imaging sensor. The imaging sensor may employ a rolling shutter, where image rows or columns are read out and reset sequentially.

In some embodiments, the imaging sensor can refer to the image sensor of a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, and the like.

The imaging sensor may capture an image frame or a sequence of image frames at a specific image resolution. In some embodiments, the image frame resolution may be defined by the number of pixels in a frame. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution. Pixels of camera may be square. In other embodiments may take into account non-square pixels or other optical distortions.

The imaging sensor may capture a sequence of image frames at a specific capture rate. In some embodiments, the sequence of images may be captured at standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds, 0.1 seconds, 0.2 seconds, 0.5 seconds, 1 second, 2 seconds, 5 seconds, or 10 seconds. In some embodiments, the capture rate may change depending on user input and/or external conditions (e.g. illumination brightness).

The motor 103 can be configured to control rotation of the payload 117 about a single axis relative to the support 105. One or more sensors may be borne by the support and individually or collectively configured to generate a signal communicated to the motor to effect control of the rotation of the payload based on positional information about the payload.

In some embodiments, the positional sensors may include an accelerometer, a gyroscope, a compass, and/or a GPS. These sensors may be used individually or collectively to provide information about rate of acceleration or detect changes in rotational attributes, such as pitch, roll, and yaw. In some instances, the sensors may be capable of detecting linear and/or angular displacement, linear velocity and/or angular velocity, or linear or angular acceleration. In some instances, the sensors may be capable of detecting a rotation angle of the payload with respect to the connector about a rolling axis. The motor may rotate the image sensor in accordance with information from the positional sensor responsive to rotation of the payload about the rolling axis. In other embodiments, one or more sensors may be further provided. For example, capacitive angular sensor, Hall sensor or a shaft encoder may be coupled to a frame which the payload is rigidly connected to so to determine the current orientation of the axis. Accordingly the motor may rotates the payload in accordance with information from the positional sensor responsive to rotation of the payload about the rotation axis.

In some embodiments, positional information about the payload may be derived with aid of one or more positional sensors 107 borne by the support 105. In this case, the support 105 may be configured to be rigidly connected to the payload 117 so that movement of the support corresponds to the movement of the payload. Accordingly, positional information of the support to which the positional sensors are borne may be representative of the positional information of the payload.

In some embodiments, the positional sensors 107 borne by the support may comprise a single-axis accelerometer and a single-axis gyroscope. The accelerometer and gyroscope may be rigidly coupled to the imaging sensor. The axes of the positional sensors may be parallel to the axes of the imaging sensor.

Alternatively, positional information about the payload may be derived with aid of one or more positional sensors borne by the payload 117. In this case, the support 105 may be rotatably coupled to the payload 117 so that a relative rotational movement of the payload is permitted with respect to the support.

In some embodiments, the positional sensors borne by the payload may comprise a three-axis accelerometer and a three-axis gyroscope. The accelerometer and gyroscope may be rigidly coupled to the imaging sensor. The three axes of the accelerometer and gyroscope may be orthogonal to each other. In some cases, the axes of the accelerometer and the gyroscope may be orthogonal to the axes of the imaging sensor.

The single axis about which the payload is controlled to rotate may be a roll axis. By way of illustration, the roll axis may be parallel to an optical axis 125 of the imaging sensor as shown in FIG. 1. The optical axis of an imaging sensor, which may also be referred to as the "principal axis," can be a line along which there is some degree of rotational symmetry in the imaging sensor. In some embodiments, the optical axis of the imaging device passes through the center of the optical components (e.g., lens, photo sensor) of the imaging device.

Figure 8:
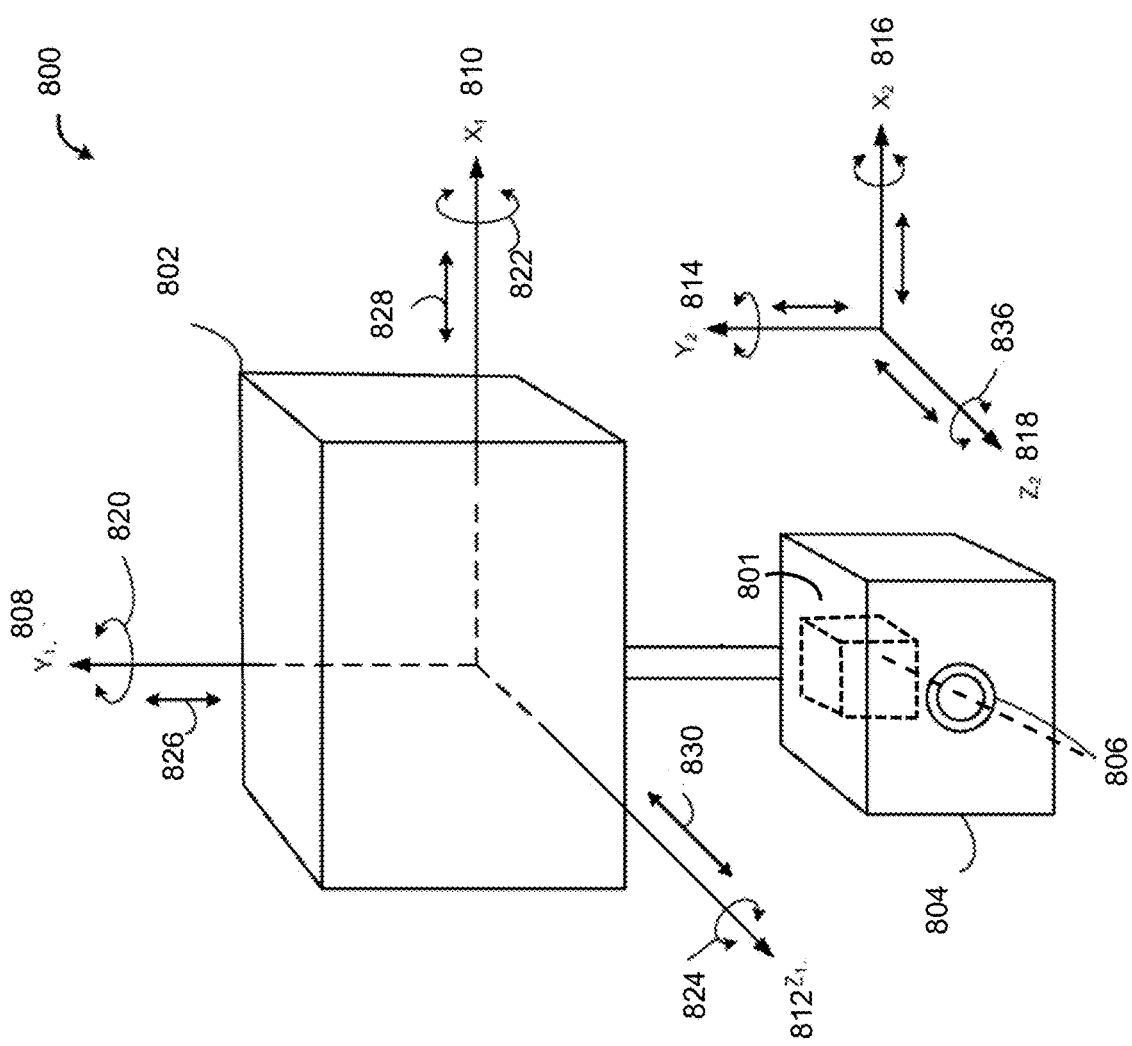
FIG. 8 illustrates an exemplary configuration of a movable object and payload, in accordance with embodiments.

Details of roll axis rotation are explained in FIG. 8. FIG. 8 illustrates an exemplary configuration 800 of a movable object and payload, in accordance with embodiments. The configuration 800 is used to illustrate exemplary types of adjustment to the movable object 802 and/or payload 804 that may be used to track a target. The movable object 802 and the payload 804 can include any embodiments discussed herein. For example, the movable object 802 can include a UAV and the payload 804 can include an imaging device 806.

The movable object 802 may be capable of rotating around up to three orthogonal axes, such as $X_1$ (pitch) 810, $Y_1$ (yaw) 808 and $Z_1$ (roll) 812 axes. The rotations around the three axes can be referred to as the pitch rotation 822, yaw rotation 820, and roll rotation 824, respectively. The angular velocities of the movable object 802 around the $X_1$, $Y_1$, and $Z_1$ axes can be expressed as $\omega_{X1}$, $\omega_{Y1}$, and $\omega_{Z1}$, respectively. The movable object 802 may also be capable of translational movements 828, 826, and 830 along the $X_1$, $Y_1$, and $Z_1$ axes, respectively. The linear velocities of the movable object 802 along the $X_1$, $Y_1$, and $Z_1$ axes can be expressed as $V_{X1}$, $V_{Y1}$, and $V_{Z1}$, respectively.

In the exemplary configuration, the payload 804 is coupled to the movable object 802 via a stabilizing unit 801. The stabilizing unit 801 may correspond to the stabilizing unit 105 in FIG. 1. The stabilizing unit 801 may be capable of causing the payload 804 to move relative to the movable object around and/or along to $Z_2$ (roll) 818, ($X_2$ (pitch) 816, $Y_2$ (yaw) 814 are the orthogonal axes with respect to $Z_2$). The $X_2$, $Y_2$, and $Z_2$ axes may be respectively parallel to the $X_1$, $Y_1$, and $Z_1$ axes. In some embodiments, where the payload includes an imaging sensor 806, the roll axis $Z_2$ 818 may be substantially parallel to an optical path or optical axis for the imaging sensor 806. The imaging sensor as described herein may be configured to capture images. The stabilizing unit 801 may cause the imaging sensor 806 to rotate around $Z_2$ (roll) 818 based on control signals provided to motors of the stabilizing unit. The rotations around the roll axis can be referred to the roll rotation 836.

Referring to FIG. 1, the motor may rotate the payload upon receiving a signal generated by one or more processors 109 borne by the support. These processors may be located on a central body of the support or on a peripheral part of the support (e.g., on a carrier coupled to the payload). One or more processors of the present disclosure can be situated on any suitable portion of a support, such as above, underneath, on the side(s) of, or within a body of the support. The processors may be located on a center or off-center of the support. Some processors can be mechanically coupled to the support such that the spatial disposition and/or motion of the support correspond to the spatial disposition and/or motion of the processors. The processor can be coupled to the support via a rigid coupling, such that the processor does not move relative to the portion of the support to which it is attached. The coupling can be a permanent coupling or non-permanent (e.g., releasable) coupling. Suitable coupling methods can include adhesives, bonding, welding, and/or fasteners (e.g., screws, nails, pins, etc.). Optionally, the processor can be integrally formed with a portion of the support. Furthermore, the processor can be electrically coupled with a portion of the support (e.g., processing unit, control system, data storage, microcontroller) so as to enable the data collected by the processor to be used for various functions of the support (e.g., stabilize payload) such as the embodiments discussed herein.

The processors 109 may receive signals (e.g., input signals) and output command signals. For example, the processors may receive input signals from the aforementioned sensors (e.g., Hall sensor, gyroscope, accelerometer, etc) and/or users. Based on the received signals, the processors may output commands to motors, e.g., to actuate. A processor may communicate receive and output signals via a wired or wireless connection. For example, a motor may have receiver and to receive output signals from the processor. Alternatively or in conjunction, the movable object (e.g., UAV) may receive signal and send hardwired signals down to the motor.

In some instances, more than one controller may work in conjunction. The plurality of controllers may be located on the same or different portions of the support.

The processor 109 may send a signal or signals to one or more actuators that causes actuation of the payload. Output signals by the processor may control a degree of actuation, position, velocity, acceleration of the motor, and/or torque produced by the motor. The output signals by the processor may effect actuation of a payload to rotate about an axis.

The processor 109 may include any electronic device or set of electronic devices responsible for signal processing, manipulation of data, and communicate to motors. The processor can be a programmable processor (e.g., a central processing unit (CPU) or a microcontroller). For example, the positional information derived from positional sensors may be calculated in a field programmable gate array (FPGA) and/or one or more ARM processors. In some instances, the processor may generate a communication signal based on the positional information and a user input. The user input or instructions that affect the output signal may be stored on a non-transitory computer readable medium. The processor can be operatively coupled to the non-transitory computer readable medium. The non-transitory computer readable medium can store logic, code, and/or program instructions executable by the processor for performing one or more steps. The non-transitory computer readable medium can include one or more memory units (e.g., removable media or external storage such as an SD card or random access memory (RAM)).

In some instances, an orientation of the payload may be defined with respect to the environment (e.g., the ground). In some instances, an orientation of the payload may be defined with respect to a structure of the movable object (e.g., connector). In some instances, an orientation of the payload may be defined relative to a support structure or external device to which the payload is coupled to (e.g., support). The orientation may be static (e.g., fixed orientation with respect to the environment or UAV). The orientation may be dynamic (e.g., changing). In some instances, a user may specify how an orientation is, and how it may change.

In some embodiments, the processor 109 may generate the signal to stabilize the payload such that the payload does not rotate about the roll axis with respect to its initial (rest) position in the absence of external steering signals. Stabilization can be accomplished by compensating a rotational displacement/distortion detected by the positional sensors. The rotational displacement can be a relative rotation with respect to a rest position or initial position. The rotational information may comprise angular velocity, angular acceleration, and/or angle of rotation. In some instances, the positional information of the payload rotating about an axis may be received from a single-axis accelerometer and a single-axis gyroscope, whereby the axes of the positional sensors may be parallel to the rotation axis.

In other instances, the positional information of the rotation of the payload may be derived from a three-axis accelerometer and three-axis gyroscope, whereby the axes of the positional sensors (i.e., accelerometer and gyroscope) may be orthogonal to the axes of the imaging sensor. In such case, rotational displacement/distortion about the roll axis may be resolved by further using a shaft encoder to determine the current orientation of the roll axis. Coordinate transformation may be applied to the angles in the stabilizing unit coordinate system and a global coordinate system. The resolved rotational displacement/distortion may be used to drive the motor on the roll axis to correct for the rotational distortion. For example, the processor may generate a signal to adjust the payload about a roll axis in a direction of rotation that opposes the measured rotation of the payload about the axis using a negative feedback control loop.

In some instances, axes of the accelerometer and gyroscope are orthogonal to the axes of the imaging sensor. However the orientation of the gyroscope and accelerometer may be unknown. To determine the orientation, three rotation axes may be permutated and an optimization step may be performed for each permutation. The permutation that minimizes the objective best may correspond to the imaging sensor's axis ordering.

The angle of the payload rotation may be sent to the controller, e.g., in real time or at set intervals. For example, the angle of the actuator may be sent to the controller at about or less than every 0.0001 seconds, 0.0002 seconds, 0.0005 seconds, 0.001 seconds, 0.002 seconds, 0.005 seconds, 0.01 seconds, 0.02 seconds, 0.05 seconds, 0.1 seconds, 0.2 seconds, 0.5 seconds, 1 second, 2 seconds, 5 seconds, 10 seconds, 30 seconds, or 60 seconds. Based on the input (e.g., from the user) and data from the one or more sensors (e.g., sensed degree of rotation), the controller may instruct the motor to actuate in order to rotate the payload. Based on the input (e.g., from the user) and data from the one or more sensors (e.g., sensed degree of rotation), the payload may be rotated to a desired orientation.

In some instances, the payload may comprise an imaging sensor and the roll axis may be substantially parallel to the optical axis of the imaging sensor. Accordingly, the processor may be configured to stabilize the orientation of the imaging sensor in terms of roll axis rotation.

In other embodiments, the processor 109 may generate the signal to maintain the payload in a desired orientation in presence of a steering signal. The desired orientation may be preselected from a plurality of options. For example, the desired orientation may be selected between a horizontal orientation and a vertical orientation. For example, the desired orientation may be selected between a degree of angle that the imaging device rotates about a roll axis, e.g., 0 degrees, 30 degrees, 45 degrees, 60 degrees, 90 degrees, 120 degrees, 150 degrees, 180 degrees, etc. In some instances, the desired orientation may be selected along a continuous spectrum (e.g., angles that the imaging device may be rotated about a roll axis). In some instances, a user may input a specific desired orientation (e.g., numerical value of degree of rotation of the payload about a roll axis). In some instances, a user may select a specific desired orientation from a list. In some instances, an option to incrementally change an orientation (e.g., by 15 degrees) may be presented to the user via a user interface. For example, the user may desire to capture an image with a horizontal orientation, a vertical orientation, or an image having an arbitrary orientation (e.g., diagonal orientation). An image having a horizontal orientation may correspond to a landscape image. An image having a vertical orientation may correspond to a portrait image. An imaging sensor may capture an image having a horizontal orientation in a default position (e.g., upright, resting position, etc.). For example, in some cases, when the imaging device is coupled to a connector at a default state, the imaging device may capture an image having a horizontal orientation. The imaging device may capture an image having a vertical orientation if rotated 90 degrees about the roll axis.

The processor 109 may receive the desired orientation of an image to be captured by the imaging device (e.g., camera). The processor may further receive a degree of rotation of the payload (e.g., in real time) from one or more sensors as previously described herein. Based on the desired orientation and/or the sensed degree of rotation of the payload, the processor may instruct the motor to actuate (e.g., either in a clockwise or counterclockwise direction) in order to rotate the imaging device such that an image having a desired orientation may be captured.

Additional sensors (e.g., Hall sensors, shaft encoders) as previously mentioned may provide information regarding a current orientation of the axes of the payload. Optionally, the signal generated by the processor to rotate the payload may be based on the angular displacement between the desired orientation and measured orientation from the positional sensors. In this case, the positional sensors may further include attitude sensors (e.g., a compass or magnetometer) to derive on orientation of the payload with respect to a global coordinate system.

In yet other embodiments, the one or more processors may be configured such that the actuator (e.g., motor) actuates only in response to an unwanted movement (e.g., vibrations and shaking), and does not actuate in response to a deliberate movement (e.g., a walking motion). For example, a low pass filter may be used to smooth out low-frequency motion such as those induced by walking, so that the motor may only be responsive to the high-frequency motion such as shaking.

Referring to FIG. 1, the payload may further comprise one or more processors configured to process images captured by the imaging sensor based on the positional information of the payload. Images captured by the imaging sensor may have minimized/reduced rotation about the roll axis as well as reduced high-frequency vibration prior to image processing, such that the empty regions in resulting images after processing are significantly reduced. The positional information utilized for image processing may be derived from a three-axis accelerometer and a three-axis gyroscope, and may comprise the rotation and acceleration data of the payload about one or more axes.

In some embodiments, the one or more processors may include an image correction unit and data correction unit. These processors are configured to receive the positional information about the payload, determine a rotational distortion of the imaging sensor about the single axis of rotation based on the positional information and generate the signal to rotate the payload about the single axis of rotation to compensate the rotational distortion.

The processors (e.g., image correction unit and data correction unit) may be located on a central body of the payload or on a peripheral part of the payload (e.g., on a carrier coupled to the payload). One or more processors of the present disclosure can be situated on any suitable portion of a payload, such as above, underneath, on the side(s) of, or within a body of the payload. The processors may be located on a center or off-center of the payload. Some processors can be mechanically coupled to the payload such that the spatial disposition and/or motion of the payload correspond to the spatial disposition and/or motion of the processors. The processors can be coupled to the payload via a rigid coupling, such that the processors do not move relative to the portion of the payload to which it is attached. The coupling can be a permanent coupling or non-permanent (e.g., releasable) coupling. Suitable coupling methods can include adhesives, bonding, welding, and/or fasteners (e.g., screws, nails, pins, etc.). Optionally, the processors can be integrally formed with a portion of the payload. Furthermore, the processors can be electrically coupled with a portion of the payload (e.g., processing unit, control system, data storage, microcontroller) so as to enable the data collected by the processor to be used for various functions of the payload (e.g., control, image processing, etc.), such as the embodiments discussed herein.

In some embodiments, the one or more processors for processing image frames may be embedded in the imaging sensor. The one or more processors may include an image correction unit. Additionally, processors for adjusting apertures of the lens or zooming of the camera may also be located on-board of the imaging sensor. The processors may be embedded in an imaging device or located on-board of the image sensor.

The configuration of the stabilizing unit described herein may be compact and light-weight. A compact and light-weight stabilizing unit may be especially beneficial for mobile use, or when coupling the stabilizing unit to a vehicle such as a UAV, which usually has restrictions on the volume and weight of the payload that it can carry. In some instances, a compact and light configuration may enable the payload to be mounted within a shell/housing of the UAV.

For example, in some cases, a total volume of space occupied by the stabilizing unit may be about, equal to, or less than about 1000 $cm^3$, 750 $cm^3$, 500 $cm^3$, 400 $cm^3$, 300 $cm^3$, 250 $cm^3$, 200 $cm^3$, 175 $cm^3$, 150 $cm^3$, 125 $cm^3$, 100 $cm^3$, 75 $cm^3$, 50 $cm^3$, 40 $cm^3$, 30 $cm^3$, 20 $cm^3$, 15 $cm^3$, 10 $cm^3$, 5 $cm^3$, or 1 $cm^3$. A volume of space occupied by the stabilizing unit may refer to a space encompassed by the outer boundaries of a support (e.g., support 105).

In some instances, the stabilizing unit may have a weight that is equal to about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a weight of the payload. In some instances, the stabilizing unit may have a weight that is less than about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a weight of the payload. In some instances, the stabilizing unit may have a weight between about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a weight of the payload. In some instances, the stabilizing unit may have a weight that is no more than 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a weight of the payload. A weight of the stabilizing unit may be less than a weight of the camera payload.

The stabilizing unit may perform stabilization at or greater than a rate of 100 Hz, 200 Hz, 300 Hz, 400 Hz, or 500 Hz. In some instances, when a single-axis stabilizing unit is used for stabilization, the rate may be synchronized with the IMU interruption rate. For example, when a set of positional data measured by IMU are acquired, the IMU may generate an interrupt (e.g., data ready interrupt) indicative of the IMU having positional data for output. Accordingly, stabilization performs at the time each IMU interruption signal generated. In some embodiments, conventional control systems such as proportional integral derivative control may be used in conjunction with the stabilizing unit. In other embodiments, fuzzy PID control system may be used to control the motor in the stabilizing unit.

The stabilizing unit in the present disclosure may be powered (e.g., actuated) by a support structure or an external device (e.g., the UAV). Alternatively, or in conjunction, the stabilizing unit may comprise an autonomous power source (e.g., battery) used to power the stabilizing unit. In some instances, the stabilizing unit may be manually powered.

In another aspect of the disclosure a method for correlating image data with positional data is provided. In practicing, the method may comprise: obtaining one or more sets of image data derived from an imaging sensor configured to capture one or more images, wherein an individual set of image data is associated with an image timestamp based on a time at which the individual set of image data was derived; obtaining one or more sets of positional data derived from one or more positional sensors configured to measure positional state of the imaging sensor, wherein an individual set of positional data is associated with a positional timestamp based on a time at which the individual set of positional data was derived; and correlating, with aid of one or more processors, a set of image data with a corresponding set of positional data based on an associated image timestamp and an associated positional timestamp.

In another separate yet related aspect, the present disclosure provides an apparatus for correlating image data with positional data. In practicing, the apparatus may comprise one or more processors that are, individually or collectively, configured to obtain one or more sets of image data derived from an imaging sensor configured to capture one or more images, wherein an individual set of image data is associated with an image timestamp based on a time at which the individual set of image data was derived; obtain one or more sets of positional data derived from one or more positional sensors configured to measure positional state of the imaging sensor, wherein an individual set of positional data is associated with a positional timestamp based on a time at which the individual set of positional data was derived; and correlate, with aid of one or more processors, a set of image data with a corresponding set of positional data based on an associated image timestamp and an associated positional timestamp.

In some embodiments, the image data to be correlated can be derived from an imaging sensor configured to capture one or more image frames. Examples of the imaging sensor and image frame have been previously described. For example, an imaging sensor may include complementary metal oxide semiconductor (CMOS) sensors that generate electrical signals in response to different wavelengths of light. The resulting electrical signals can be processed to produce image data. In some instances, the image data generated by an imaging device can include one or more images, which may be static images (e.g., photographs), dynamic images (e.g., video), or suitable combinations thereof. In other instances, the image data may refer to a portion of an image frame. The image data can be polychromatic (e.g., RGB, CMYK, HSV) or monochromatic (e.g., grayscale, black-and-white, sepia).

In some embodiments, the image sensor may employ a rolling shutter, where an image frame contains rows or columns of pixels that are read out and reset sequentially. The image frame may be captured by a rolling shutter camera such that the image frame comprises a plurality of groups of pixels exposed to light at consecutive time points. Rolling shutter may be vertical or horizontal. The delay of exposure time for adjacent rows may be determined by exposure duration of a frame and total number of rows in the frame. For example, for an image frame that contains 1080 rows and is captured at a rate of 0.0001 second, the delay between two adjacent rows is approximately 0.093 µs (0.0001/1080 second).

In some embodiments, a set of image data may refer to a group of pixels within a frame of image captured by the imaging sensor wherein the imaging sensor comprises a rolling shutter. In an image frame captured by a rolling shutter imaging sensor, one or more rows may be grouped together as a group of pixels (i.e. a set of image data). For example, an image frame may be divided into n groups, and the number of rows contained in each group may be determined by the total number of rows of the frame and n. Therefore, exposure time of each group may be determined by the frame rate and number of groups. In some instances, the exposure time of each group may range from 0.093 µs to 10 s. Accordingly, the difference between adjacent time points associated with two adjacent groups may range from 0.093 µs to 10 s.

In some embodiments, a group of pixels (i.e. a set of image data) may refer to one or more rows of pixels. In some alternative embodiments, a group of pixels (i.e. a set of image data) may refer to one or more columns of pixels. Given that the time difference between adjacent groups is small (e.g., 0.09 µs), all the pixels within a group may be associated with the same time point. For example, the first group of a frame may be associated with time $t_1$, and the second group may be associated with time $t_2$. A time point associated with an individual group may be the time at which the first row within the group is captured. In other examples, a time point associated with an individual group can be the time at which any row within the group is captured.

In yet another embodiment, a set of image data may refer to an entire image frame such as image frame captured by a global shutter imaging sensor. In this case, all the pixels within an image frame may be exposed to light simultaneously. It should be noted that when using a global-shutter, the time taken as the acquisition time of an image frame, may be preferably the middle of the frame exposure time. Conversely, when using a rolling-shutter image sensor, the time taken as the acquisition time of the image frame, may be the middle of each row/column exposure time.

An individual set of image data may be associated with an image timestamp based on a time at which the individual set of image data was derived. An image timestamp may include data of any length, such as 32 bit or 64 bit, and may be indicative of time.

In some embodiments, one or more sets of positional data may be obtained concurrently with obtaining the image data. The one or more sets of positional data may be derived from one or more positional sensors configured to measure positional state of the imaging sensor, wherein an individual set of positional data is associated with a positional timestamp based on a time at which the individual set of positional data was derived.

In some embodiments, the positional state of the imaging sensor may refer to the instant orientation of the imaging sensor. The orientation may be represented as a rotation matrix R(t), where R(t)∈SO(3). The rotation matrix R(t) may contain an orientation of the imaging sensor at the time at which an associated set of image data is captured. In some embodiments, quaternions may be used to represent rotations. It is noted that there are various ways to represent rotations as long as the representations can facilitate smooth interpolation.

The positional data obtained by positional sensors may comprise at least attitude information, including a pitch angle, a yaw angle, and/or a roll angle of the image device relative to a reference frame. The reference frame may be associated with a global coordinate frame. The angles as described above may be computed by integrating angular velocity of the imaging device. The angular velocity of the imaging device may comprise a rotational direction and a rotational speed of the imaging device. In some alternative embodiments, angles can be derived by double-integration of angular acceleration. In some embodiments, an individual set of positional data may comprise rotation data and acceleration data of the imaging sensor about one or more axes. The one or more axes may include pitch, yaw and/or roll axis with respect to a global coordinate frame.

An individual set of positional data of the imaging sensor may be retrieved from one or more positional sensors. In some embodiments, the one or more positional sensors may comprise a gyroscope and/or an accelerometer. Accordingly, a positional timestamp may be indicative of a time at which the associated set of positional data is measured by the gyroscope and/or the accelerometer. A positional timestamp may include data of any length, such as 32 bit or 64 bit, and may be indicative of time.

In some embodiments, the instantaneous position of the imaging sensor may be determined using a range-finding and/or locating device. The range-finding and/or locating device may be a location sensor (e.g., Global Positioning System (GPS)) device, mobile device transmitters enabling location triangulation. In some embodiments, the positional data of image device may be retrieved from inertial sensors (e.g., accelerometers, gyroscopes, inertial measurement units (IMUs)), altitude sensors, attitude sensors (e.g., compasses) pressure sensors (e.g., barometers), and/or field sensors (e.g., magnetometers, electromagnetic sensors).

In practice, when a gyroscope is used for measuring positional information, gyroscope drift may be inevitable. Since the gyroscope drift can significantly compromise measurement accuracy, various methods have been employed to compensate for the drift. One way to accomplish gyroscope correction is to run a calibration operation to determine the drift value. Alternatively, gyroscope drift can be eliminated by applying a filter to one or more sets of positional data in real-time.

In some embodiments, gyroscope drift can be eliminated by applying a complimentary filter to sets of positional data including gyroscope data and accelerometer data. An orientation angle of the image device at a sampling time which is free of gyroscope drift may be obtained based on the following equation:

$$\theta_{i+1}=\alpha(\theta_i+\omega_{i+1}\Delta t)+(1-\alpha)\theta_{i_{acc}}$$

where $\theta_{i+1}$ is the orientation angle of image device at current gyroscope sample time, $\theta_i$ is the orientation angle of image sensor at last gyroscope sample time, $\alpha$ is a number ranging from 0 to 1, $\omega_{+1}$ is the gyroscope output angular velocity at current gyroscope sample time, $\theta_{i_{acc}}$ is the orientation angle of imaging sensor derived from accelerometer data. $\Delta t$ is the sampling time. It is noted that complimentary filter may have different orders, as in the presented example a first order is used, however higher order may be adopted for improved filtering result. In other embodiments, a Kalman filter or an Extended Kalman Filter (EKF) may be used to minimize gyroscope drift by merging accelerometer data and gyroscope data. In yet another embodiment, a combination of Kalman filter and complimentary filter may be used to correct for gyroscope drift.

In other embodiments, various combination of sensor fusion can be used for correcting gyroscope drift, such as gyroscope data combined with compass data, gyroscope combined with GPS data, gyroscope combined with GPS and compass, etc.

FIG. 2A is an exemplary diagram depicting a data correlation process. The method may comprise correlating a set of image data with a corresponding set of positional data based on an associated image timestamp and an associated positional timestamp.

Figure 2:
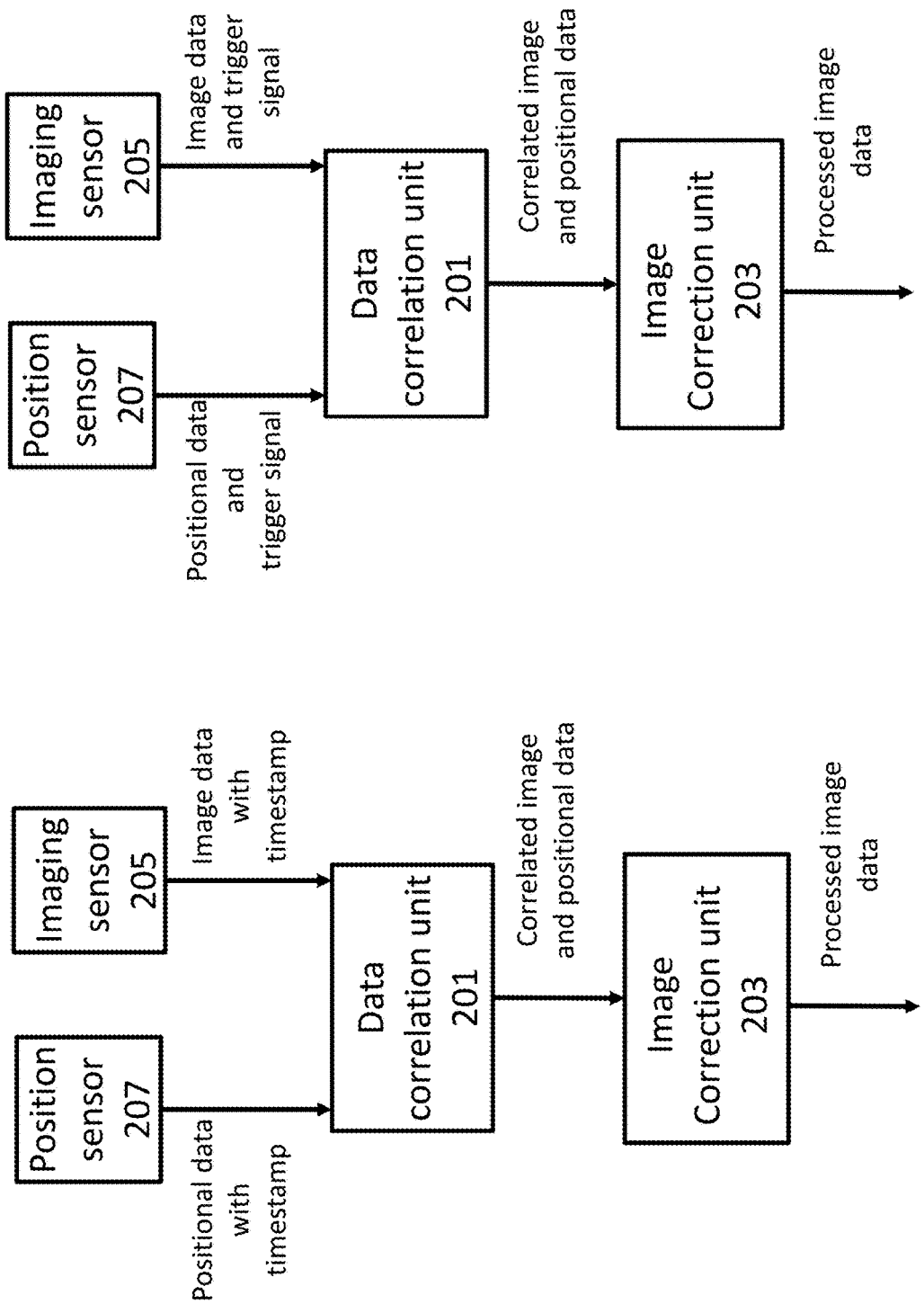
FIG. 2 is an exemplary diagram depicting data correlation processes.

As shown in FIG. 2 part A, data correlation unit 201 and image correction unit 203 have been previously described as the one or more processors on board the payload. They may include one or more processors configured to communicate with various sensors and components of a system (e.g., the system of FIG. 1). The data correlation unit 201 may be configured to receive signals or data from sensors such as imaging sensor and positional sensor, and further process data before outputting data to other processors. The data correlation unit may also be configured to send signals (such as request signals) to sensors.

Figure 4:
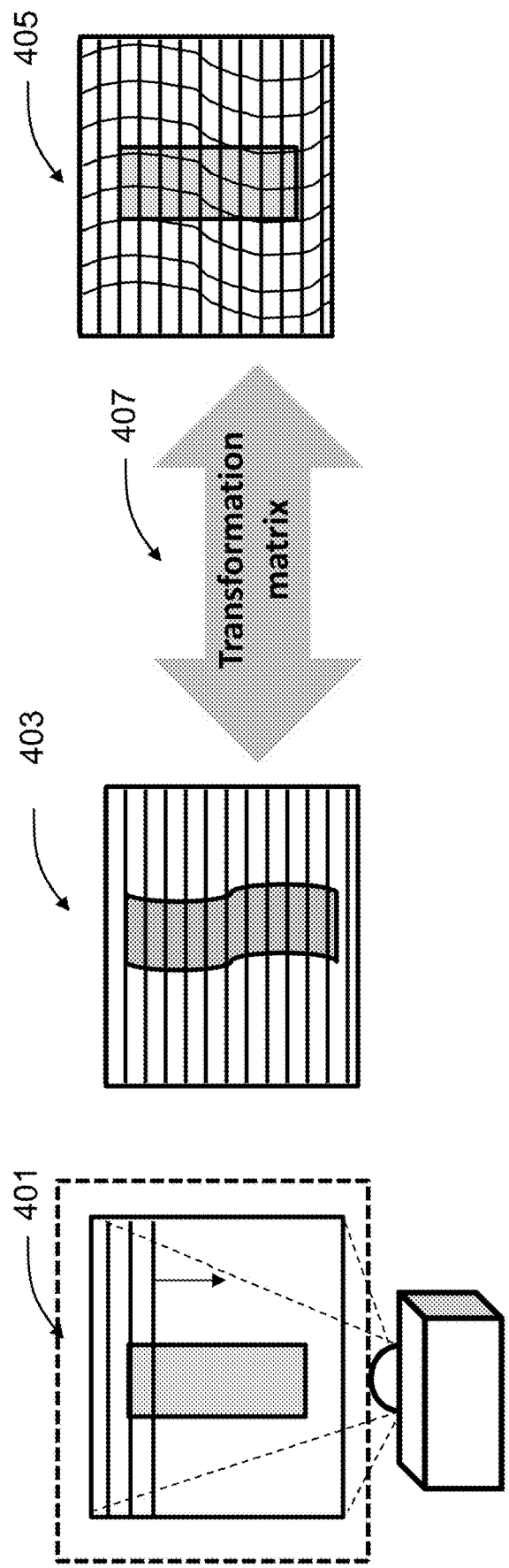
FIG. 4 illustrates an exemplary image frame subjected to rolling shutter effect and the corrected image frame.

The image correction unit 203 may be configured to receive signals or data from the data correlation unit or raw data directly from positional sensors and imaging sensors, and further process the signals or data as described later in FIGS. 4 and 5.

As shown in FIG. 2 part A, the imaging sensor 205 may generate an image timestamp indicative of a time at which the associated set of image data is captured by the imaging sensor. In some embodiments, the timestamp can be generated upon a shutter signal. The shutter signal may be triggered by a shutter controller of the imaging sensor which is used to initiate an image acquisition process. It is noted that other shutter signals may be used for the timestamp, such as a shutter closed signal. In some instances, the timestamp may not refer to the exact time at which a shutter signal is received. For example, when a set of image data refers to an image frame, the timestamp may be at a center exposure time which is between two consecutive shutter signals. The exposure time may be based on an average of exposure time of imaging device. In other embodiments, the timestamp can be generated upon a data ready for output interrupt. For example, when a set of image data such as an image frame is acquired, the imaging sensor may generate an interrupt (e.g., frame done/ready interrupt) indicative of the imaging sensor having image data for output. The interrupt signal can be transmitted to other processors including a flag set to a true value, to trigger a series of events. The image timestamp information can be appended to or embedded in each set of acquired image data by the imaging sensor. The image timestamp data may be stored with the image data in any form such as a 32 bit data or 64 bit data. In some embodiments, the image data along with image timestamp may be stored in a computer readable medium before forwarding to the data correlation unit. It is noted that any suitable computer readable medium may be used. For example, the computer readable medium may include non-transitory computer readable medium, where the non-transitory computer readable medium can include one or more memory units (e.g., removable media or external storage such as an SD card or random access memory (RAM)). Alternatively, the image data along with image timestamp may be forwarded to the data correlation unit directly without storing in a medium.

In some embodiments, image timestamp may be generated along with each set of image data. The rate of timestamp generation may be determined by the exposure time for each set of image data. The rate may be less than or equal to about 0.01 µs, 0.02 µs, 0.05 µs, 0.1 µs, 0.2 µs, 0.5 µs, 1 µs, 10 µs, 100 µs. In some instances, the rate at which image timestamp generated may not be uniform due to uneven exposure time required for each set of image data.

As shown in FIG. 2A, one or more positional sensors 207 may generate a positional timestamp at a time at which positional data is acquired by the one or more positional sensors. In some embodiments, the positional timestamp can be generated by a gyroscope indicative of a time at which the associated set of positional data is measured by the gyroscope. In some embodiments, the positional timestamp can be generated by an accelerometer indicative of a time at which the associated set of positional data is measured by the accelerometer. In some embodiments, the positional timestamps may be generated upon an output interrupt. For example, when a set of positional data such as an angular velocity measured by gyroscope is acquired, the gyroscope may generate an interrupt (e.g., data ready interrupt) indicative of the gyroscope having positional data for output. The interrupt signal can be transmitted to other processors including a flag set to a true value, to trigger a series of events. The positional timestamp information can be appended to or embedded in each set of acquired positional data by the positional sensor. The positional timestamp data may be stored with the positional data in any form such as a 32 bit data or 64 bit data.

In some embodiments, the positional timestamp may be generated along with each set of positional data. The rate of timestamp generation may be determined by the sampling rate or frequency of signals for triggering data acquisition. The rate of collecting positional data may or may not be higher than the image data acquisition rate. In most cases, the positional timestamps may not be synchronous with image timestamps. In some instances, the positional data may be processed by a processor in the positional sensor before it is forwarded to the data correlation unit. For example, the positional data from a gyroscope and accelerometer can be processed first to eliminate gyroscope drift as previously described, and then transmitted to the data correlation unit.

Any suitable means can be utilized for data transmission among sensors (e.g., positional sensor and imaging sensor) and processors (e.g., data correlation unit and image correction unit). For example, wired communication (e.g., inter-integrated circuit (I2C)) buses may be provided for data transmission. It is noted that any type and any number of wired communication buses such as I2C or serial peripheral interface (SPI) or wireless communication means (e.g., Bluetooth, Wi-Fi) can be used to accomplish data transmission. Selection of various means for transmitting data may be determined based on need of speed for transmission and bandwidth requirement. Each sensor or processor may have a separate bus/wireless channel, or in some cases communication buses can be shared by more than one sensor.

In some embodiments, an exemplary process for correlating imaging data with positional data is illustrated in FIG. 2 part A. The position sensor 207 may generate a positional timestamp at which time a set of positional data is measured. The data correlation unit 201 may subsequently receive the positional data along with the associated positional timestamp. The imaging sensor 205 may generate an image timestamp at which time a set of image data is captured. The data correlation unit 201 may subsequently receive the image data along with associated image timestamp. Upon receiving the sensor data, the data correlation unit may correlate the image data and positional data based on the associated image timestamps and positional timestamps. Further, the data correlation unit may provide the correlated image data and positional data to an image correction unit 203 for image processing.

Alternatively, the image timestamp may be generated with aid of one or more processors at a time at which the associated set of image data is received by the one or more processors. In some embodiments, the one or more processors may include a data correlation unit as described later in FIG. 2 part B.

In other embodiments, the positional timestamp may be generated with aid of one or more processors at a time which the associated set of positional data is received by the one or more processors. In some embodiments, the one or more processors may include a data correlation unit as described later in FIG. 2 part B.

FIG. 2 part B is another example illustrating a data correlation process. In FIG. 2 part B, the imaging sensor 205 may provide an image data ready signal to the data correlation unit 201 at a time at which a set of image data is acquired and ready for output. Upon receiving the signal, the data correlation unit 201 may negate an image timestamp associated with the image data. The position sensor 207 may provide a positional data ready signal to the data correlation unit at a time at which a set of positional data is acquired by the positional sensors and ready for output. The positional data ready signal may be synchronous with the image data ready signal or separated at various time intervals. The data correlation unit 201 may subsequently receive image data from the imaging sensor, and associate the image timestamp with the image data. Similarly, the data correlation unit may receive positional data from the position sensor and associate positional timestamp with the positional data. Subsequently, the data correlation unit 201 may correlate the image data and positional data based on the image timestamps and positional timestamps. The data correlation unit 201 may then forward the correlated image data and positional data to the image correction unit 203 for image processing.

In some embodiments, there may be a time bias between the image timestamp for the set of image data and the positional timestamp for the correlated set of positional data. In FIG. 2 part B, the data correlation unit is configured to correlate the image data and positional data based on the associated timestamps. Details regarding the time bias will be explained with reference to FIG. 3.

The image correction unit 203 may be configured to process groups of pixels so that groups of pixels within a frame are aligned and rolling shutter effect is eliminated. The image correction unit can have one or more processors, such as a programmable processor (e.g., a central processing unit (CPU) or a microcontroller). The processor for processing image data may be operatively coupled to any processors of the position sensors, imaging sensors and data correlation unit (e.g., via a general purpose memory controller (GPMC) connection). Any suitable means of transmitting image data can be used, such as wired or wireless transmission. The image correction unit can be operatively coupled to a memory. The memory can include transitory and/or non-transitory storage media configured to store data, and/or logic, code, and/or program instructions executable by the image correction unit for image processing. The memory can include one or more memory units (e.g., removable media or external storage such as an SD card or random access memory (RAM)). The memory units can store positional data or other data received from motion and location devices. In some embodiments, the memory can be used to store the processing results produced by the image correction unit. In some embodiments, the processor for data correlation may be separate from the processor correction images. In some embodiments a processor for data correlation may be the same processor for correcting images.

In some embodiments, the image data and positional data can be correlated based on timestamps. In practicing, the image timestamp is indicative of a time at which the associated set of image data is received by the one or more processors, whereas the positional timestamp is indicative of a time at which the associated set of positional data is received by the one or more processors, and there is a constant time bias between the image timestamp for the set of image data and the positional timestamp for the positional data.

Figure 3:
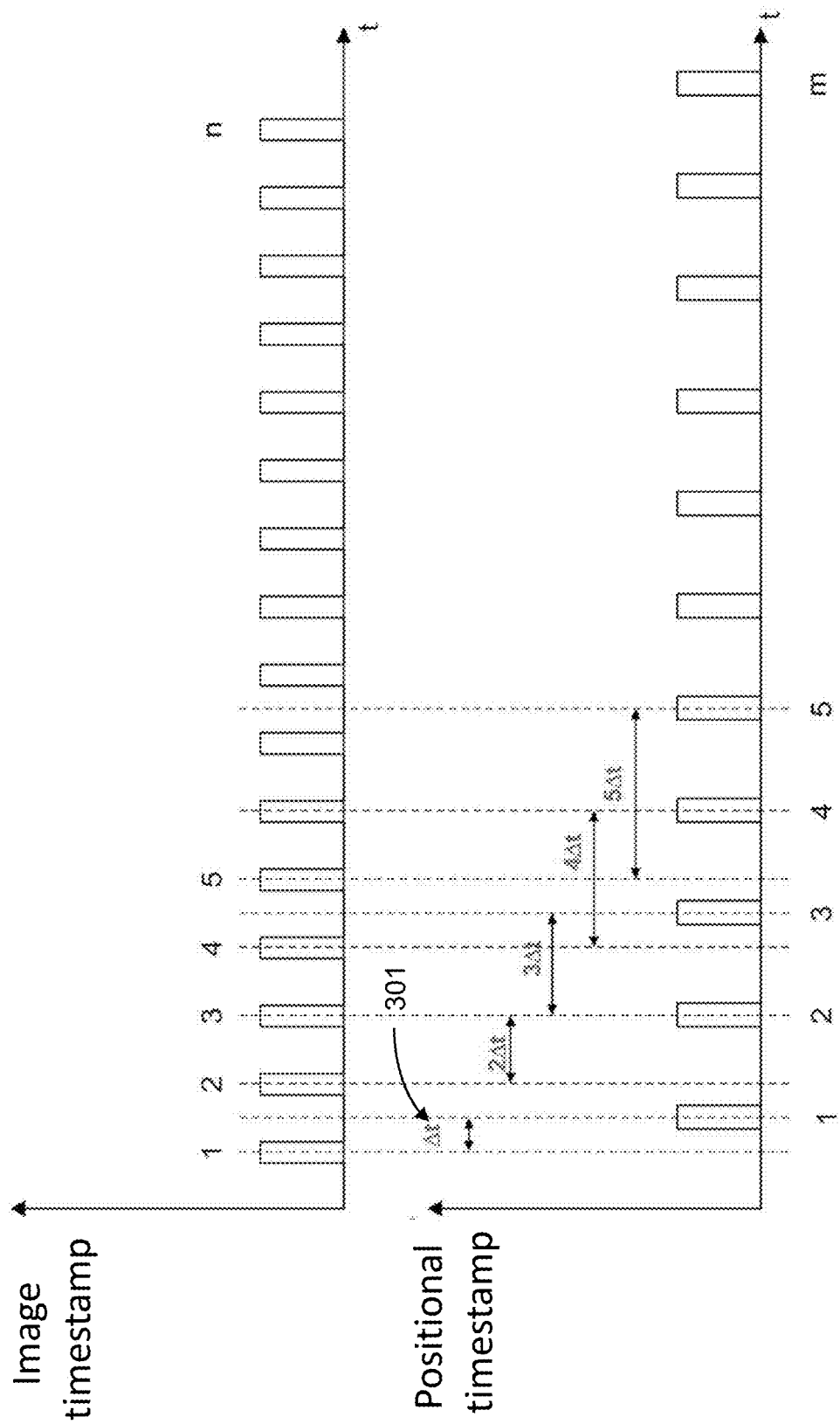
FIG. 3 is an exemplary diagram illustrating a linear relationship between image timestamps and positional timestamps

FIG. 3 is an exemplary diagram illustrating a linear relationship between image timestamps and positional timestamps. Assuming both the image timestamps and position timestamps are linear in time, the two sets of timestamps can be correlated by the following equation $$t^s = m \cdot t^i + d$$

where the coefficient m may be a constant determined by the data acquisition rate. The time bias/offset d shown as Δt 301 in the diagram may also be a constant. Various reasons may cause the constant time bias, such as unsynchronized system clock for generating the two timestamps or data transmission latency, etc. In some embodiments, a calibration process can be used to determine the time bias d 301.

In some embodiments, the correlated image data and positional data may be processed for rolling shutter correction and image stabilization. FIG. 4 illustrates an exemplary image frame subjected to rolling shutter effect, and the corrected image frame after correcting the rolling shutter effect. In some embodiments, the image sensor may comprise a rolling shutter. As mentioned previously, in a rolling shutter image device, pixels of image sensor are read top-to-bottom, left-to-right, such that the data read at the top of the frame is acquired at a point in time different from the time when the data at the bottom of the frame is acquired 401. Accordingly, when the image device is moving (e.g., panning) during the rolling shutter sequence, the resulting image will appear tilted or skewed 403. Image device motion during the exposure time may influence the warping of the image. In an image frame captured by a rolling shutter device, groups of pixels may be exposed to light at different time. In some embodiments, a set of image data may refer to a group of pixels that may be associated with an image timestamp.

Each set of image data may be correlated with a set of positional data indicative of a positional state of the imaging sensor, while capturing the set of image data via the data correlation unit. The positional state of an individual group of pixels (e.g., a set of image data) may be represented as a rotation matrix R(t), where R(t)∈SO(3). The rotation matrix is a function of time which is associated with a group of pixels. The rotation matrix R(t) contains an orientation of the imaging device at a time at which an associated group of pixels is captured. In some embodiments, quaternions may be used to represent rotations. It is noted that there are various ways to represent rotations as long as the representations can facilitate smooth interpolation.

A relationship in terms of image plane coordinates of two points imaged on two different frames may be presented by the following example equation:

$$x_j = KR(t_j)R(t_i)^T K^{-1} x_i$$

where K is an intrinsic matrix of camera. The matrix K may contain parameters of the origin of the camera axis in the image plane and the focal length. The camera's focal length may be obtained from factory standards of camera, such as 28 mm. In a planar image plane, the term $KR(t_j)R(t_i)^T K^{-1}$ 407 may represent a relatively translational shift between image points imaged at time i and j.

$KR(t_j)R(t_i)^T K^{-1}$ is the transformation matrix 407 to map image point $x_i$ to a new image plane coordinate $x_j$. When the second term of transformation matrix $R(t_i)$ represents the positional state of group Gi, and the first term $R(t_j)$ represents the positional state of a reference group captured at $t_j$, the resulting transformation of group Gi is a translation with respect to the reference group position. It should be appreciated that $t_i$ and $t_j$ may correspond to any successive Gi (group i) and Gj (group j) within a frame, where Gi may be captured later than the reference group Gj. Consequently after applying the above transformation matrix, coordinates of Gi is mapped to a new position, where the new position and image position of the reference group Gi share the same camera orientation $R(t_j)$. After the group by group correction, the original image subject to rolling shutter effect may be transformed to a new image 405 as shown in FIG. 4. However, it should be understood that the reference group could be any group within a frame, and there may be no mathematical relationship among the different groups.

Figure 5:
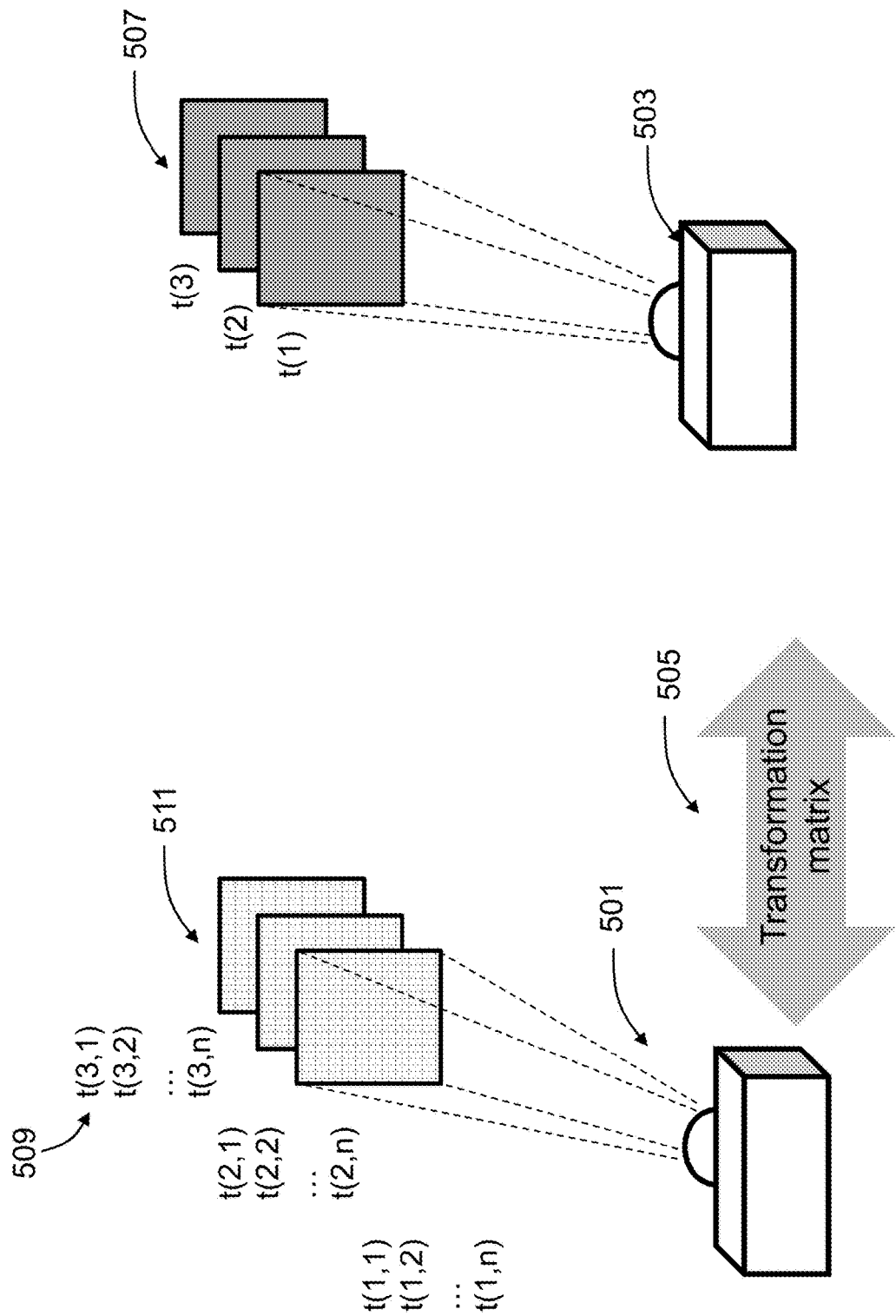
FIG. 5 illustrates an exemplary visualization of image stabilization and rolling shutter effect correction.

FIG. 5 illustrates an exemplary visualization of image stabilization and rolling shutter effect correction. $KR(t_j)R(t_i)^T K^{-1}$ is the transformation matrix 505 (spatial correction data) utilized to correct the set of image data. In some embodiments, an orientation matrix $R(t_j)$ may represent a synthetic orientation corresponding to a smoothed motion of the resulting image data. The desired motion/orientation of the corrected image data 507 may be smooth and equivalent to a global shutter 503 captured image frame (frames captured at t(1),t(2),t(3)). In some instances, $t_j$ may be a time at which the initial group of pixels 509 within an image frame is captured. For example, t(3,1) is the time at which the initial/first group of pixels in frame 3 is captured. In order to achieve a smoothed motion, positional data derived from positional sensors (e.g., gyroscope and accelerometer) which are contained in $R(t_j)$ may be processed by a filter. By way of illustration, the smoothed positional data may correspond to synthetic/corrected image data 507. In some embodiments, a low-pass filter may be applied to the one or more sets of positional data. Any suitable low-pass filter can be used, such as Gauss low-pass filter, IIR low-pass filter, FIR low-pass filter. The filter can be linear or non-linear, and the filtered positional data can represent a smoothed motion of the imaging sensor.

Positional data $R(t_i)$ associated with each individual group 511 (individual set of image data) may be derived by interpolation of known positional states with respect to timestamps. Spherical linear interpolation (SLERP) may be utilized to derive intermediate positions between two known positional states. It should be appreciated that SLERP interpolation is merely an example and that any form of interpolation may be utilized with the example embodiments. The positional data may be represented by quaternions or rotation matrices. Parameters in either representation should be able to facilitate a smooth interpolation. Various methods may be used for interpolation, such as linear or cubic interpolation (e.g., spherical linear interpolation or squad).

In some embodiments, when an imaging sensor comprising a global shutter is used, an individual group of pixels may refer to a whole image frame. In this case, the orientation of a set of image data may be presented by a rotation matrix $R(t_i)$ where $t_1$ may correspond to a time the image frame captured. In some instances, the time may be the timestamp indicative of the time that the image frame begins exposure. In other instances, the time may be corresponding to a timestamp at a center exposure time which is between two consecutive shutter signals based on an average of exposure time of imaging device once triggered to capture an image.

In some embodiments, the image correction unit 203 may be configured to process the image data for correcting rolling shutter effect and image stabilization. In some embodiments, the imaging sensor, the one or more processors, and the one or more positional sensors are on-board a payload which is supported by a movable object. The movable object may be an aerial vehicle, a land vehicle, a vehicle traversing water body, a mobile phone, a tablet, a laptop, a wearable device, or a digital camera. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avians, canines, felines, equines, bovines, ovines, porcines, delphines, rodents, or insects.

In another aspect, the present disclosure provides an apparatus for processing image data. In practicing, the apparatus may comprise: obtaining one or more sets of image data from an imaging sensor configured to capture one or more image frames; obtaining one or more sets of positional data from one or more positional sensors configured to measure a positional state of the imaging sensor; applying one or more filters to the one or more sets of positional data to generate one or more sets of filtered data; comparing the one or more sets of positional data with the one or more sets of filtered data to generate one or more sets of spatial correction data; and correcting the one or more sets of image data based on the spatial correction data.

Figure 6:
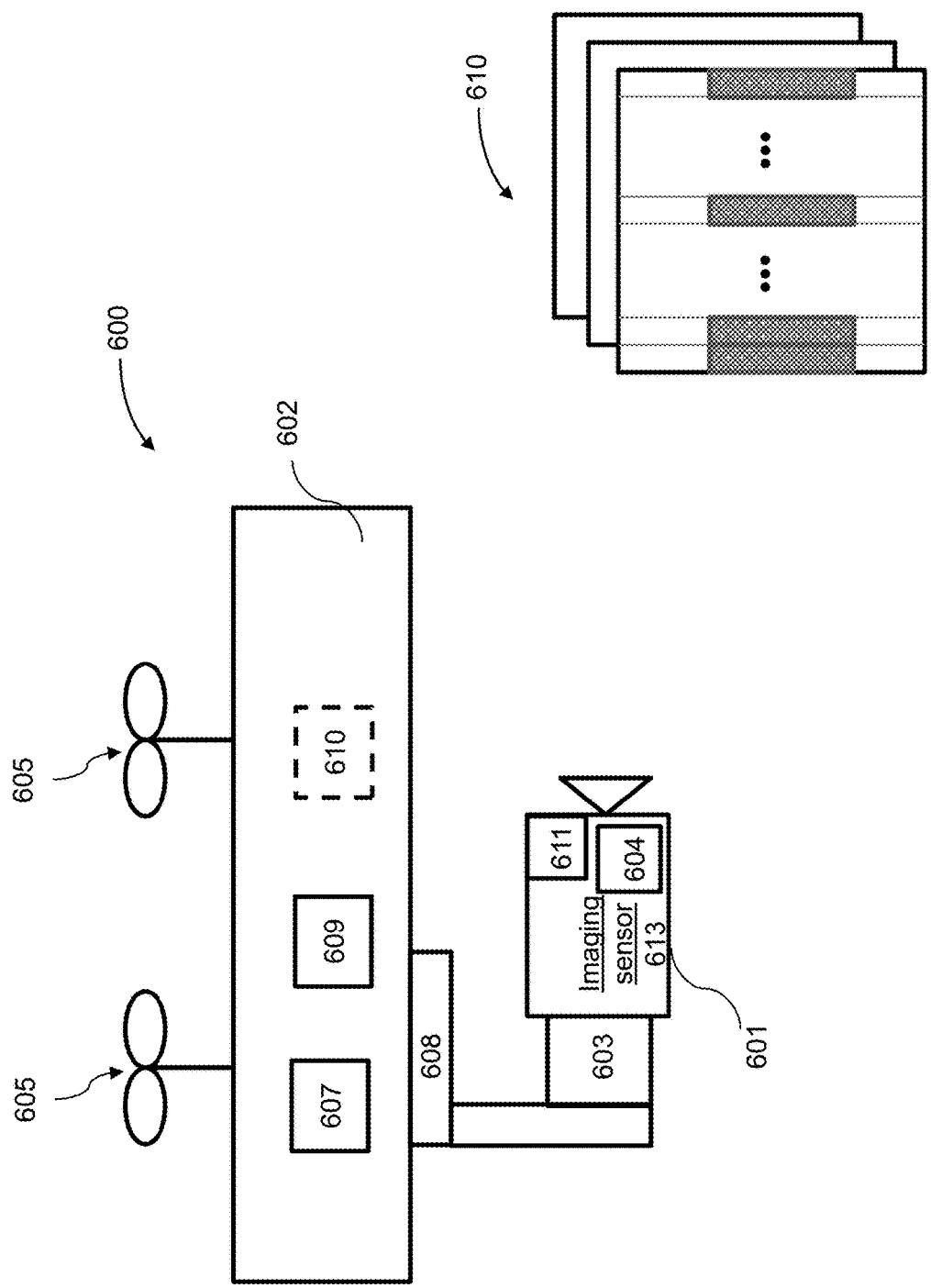
FIG. 6 depicts an exemplary movable object along with components for image stabilization and processing.

FIG. 6 illustrates a movable object 600 including a payload 601 and a body 602. Although the movable object 600 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV).

In some embodiments, the movable object 600 may be a UAV. The UAV can include a propulsion system any number of rotors (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 7 m, from 70 cm to 2 m, or from 5 cm to 5 m. Any description herein of a UAV may apply to a movable object, such as a movable object of a different type, and vice versa.

The movable object 600 may include propulsion mechanisms 605, a sensing system 607, and a communication system 609. The propulsion mechanisms 605 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 605 can enable the movable object 600 to take off vertically from a surface or land vertically on a surface without requiring any horizontal movement of the movable object 600 (e.g., without traveling down a runway). Optionally, the propulsion mechanisms 605 can be operable to permit the movable object 600 to hover in the air at a specified position and/or orientation.

For example, the movable object 600 can have multiple horizontally oriented rotors that can provide lift and/or thrust to the movable object. The multiple horizontally oriented rotors can be actuated to provide vertical takeoff, vertical landing, and hovering capabilities to the movable object 600. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 600 (e.g., with respect to up to three degrees of translation and up to three degrees of rotation).

The sensing system 607 can include one or more sensors that may sense the spatial disposition, velocity, and/or acceleration of the movable object 600 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 600 can be used to control the spatial disposition, velocity, and/or orientation of the movable object 600 (e.g., using a suitable processing unit and/or control module, as described below). Alternatively, the sensing system 600 can be used to provide positional information of the movable object 600. The positional information may include the attitude and position data of the movable object 600, to be used in conjunction with a stabilizing unit 603 for stabilization of the payload 601.

In some embodiments, the communication system 609 enables communication with display device 610 having a communication system via wireless signals. The communication systems 609, and the communication system embedded in the display device 610 may include any number of transmitters, receivers, and/or transceivers suitable for wireless communication. The communication may be one-way communication, such that data can be transmitted in only one direction. For example, one-way communication may involve only the movable object 600 transmitting data to the display device 610. The data may be transmitted from one or more transmitters of the communication system 609 to one or more receivers of the display device 610, or vice-versa. Alternatively, the communication may be two-way communication, such that data can be transmitted in both directions between the movable object 600 and the display device 610. The two-way communication can involve transmitting data from one or more transmitters of the communication system 609 to one or more receivers of the display device 610, and vice-versa.

In some embodiments, processed images may be output for display on an external device located remotely from the imaging sensor. The external device can be a display device such as, for example, a display panel, monitor, television, projector, or any other display device. In some embodiments, the output device can be, for example, a cell phone or smartphone, personal digital assistant (PDA), computer, laptop, desktop, a tablet PC, media content player, set-top box, television set including a broadcast tuner, video game station/system, or any electronic device capable of accessing a data network and/or receiving analyzed image data from the image correction unit.

In other embodiments, a display device 610 may be on board of the movable object 600. The display device may be capable to receive image date from the image correction unit via wired transmission. It is noted that any suitable means of transmitting image data can be used, such as optical fibers, storage media, computer buses and the like.

For purpose of illustration, the embodiment as shown in FIG. 6 includes a single display device. However, in other embodiments, more display devices may be included.

As shown in FIG. 6, an imaging sensor 613 may be configured to be supported by a stabilizing unit 603. In some embodiments, the imaging sensor 613 is configured to be borne by a movable object 600 via dampening element 608. In stabilizing unit 603 may correspond to the stabilizing unit 101 in FIG. 1. The dampening element 608 can mitigate the effect of motions of the movable object 600 on the payload 601. The stabilizing unit as described previously can be configured to control rotation of the imaging sensor about single axis of rotation relative to the movable object. In some embodiments, one or more processors borne by the stabilizing unit 603 generate a signal to effect control of rotation of the imaging sensor about a single axis of rotation relative to the movable object based on positional information about the imaging sensor. In some embodiments, a motor borne by the stabilizing unit is used to actuate the imaging sensor for controlling a rotation motion.

In some embodiments, the imaging sensor 613 may be mounted to a frame which can be actuated by an actuator of the stabilizing unit. In some instances, the imaging sensor may be mounted to a gimbal system which allows the imaging sensor rotate about one or more axes. As described previously herein, the imaging sensor can be rigidly connected to the stabilizing unit or rotatably connected to the stabilizing unit.

In some embodiments, the imaging sensor, one or more processors 604 (e.g., data correlation unit and image correction unit) for image processing and the one or more positional sensors for measuring positional data of the imaging sensor are on-board a payload 601 which is supported by a movable object 600. These processors 604, imaging sensor and positional sensors may be located on a central body of the payload or on a peripheral part of the payload (e.g., on a carrier coupled to the payload). These processors 604, imaging sensor and positional sensors of the present disclosure can be situated on any suitable portion of a payload, such as above, underneath, on the side(s) of, or within a body of the payload. These processors, imaging sensor and positional sensors may be located on a center or off-center of the payload. Some processors can be mechanically coupled to the payload such that the spatial disposition and/or motion of the payload correspond to the spatial disposition and/or motion of the processors. These processors, imaging sensor and positional sensors can be coupled to the payload via a rigid coupling, such that the processor does not move relative to the portion of the payload to which it is attached. The coupling can be a permanent coupling or non-permanent (e.g., releasable) coupling. Suitable coupling methods can include adhesives, bonding, welding, and/or fasteners (e.g., screws, nails, pins, etc.). Optionally, these processors, imaging sensor and positional sensors can be integrally formed with a portion of the payload. Furthermore, these processors, imaging sensor and positional sensors can be electrically coupled with a portion of the payload (e.g., processing unit, control system, data storage, microcontroller) so as to enable the data collected by the processor to be used for various functions of the payload (e.g., stabilize payload) such as the embodiments discussed herein. In some embodiments, the positional sensors include gyroscope and accelerometer to measure the orientation of the imaging sensor.

In another aspect, the present disclosure provides a method for processing image data. In practicing, the method may comprise: obtaining one or more sets of image data from an imaging sensor configured to capture one or more image frames; obtaining one or more sets of positional data from one or more positional sensors configured to measure a positional state of the imaging sensor; applying one or more filters to the one or more sets of positional data to generate one or more sets of filtered data, comparing the one or more sets of positional data with the one or more sets of filtered data to generate one or more sets of spatial correction data; and correcting the one or more sets of image data based on the spatial correction data.

Figure 7:
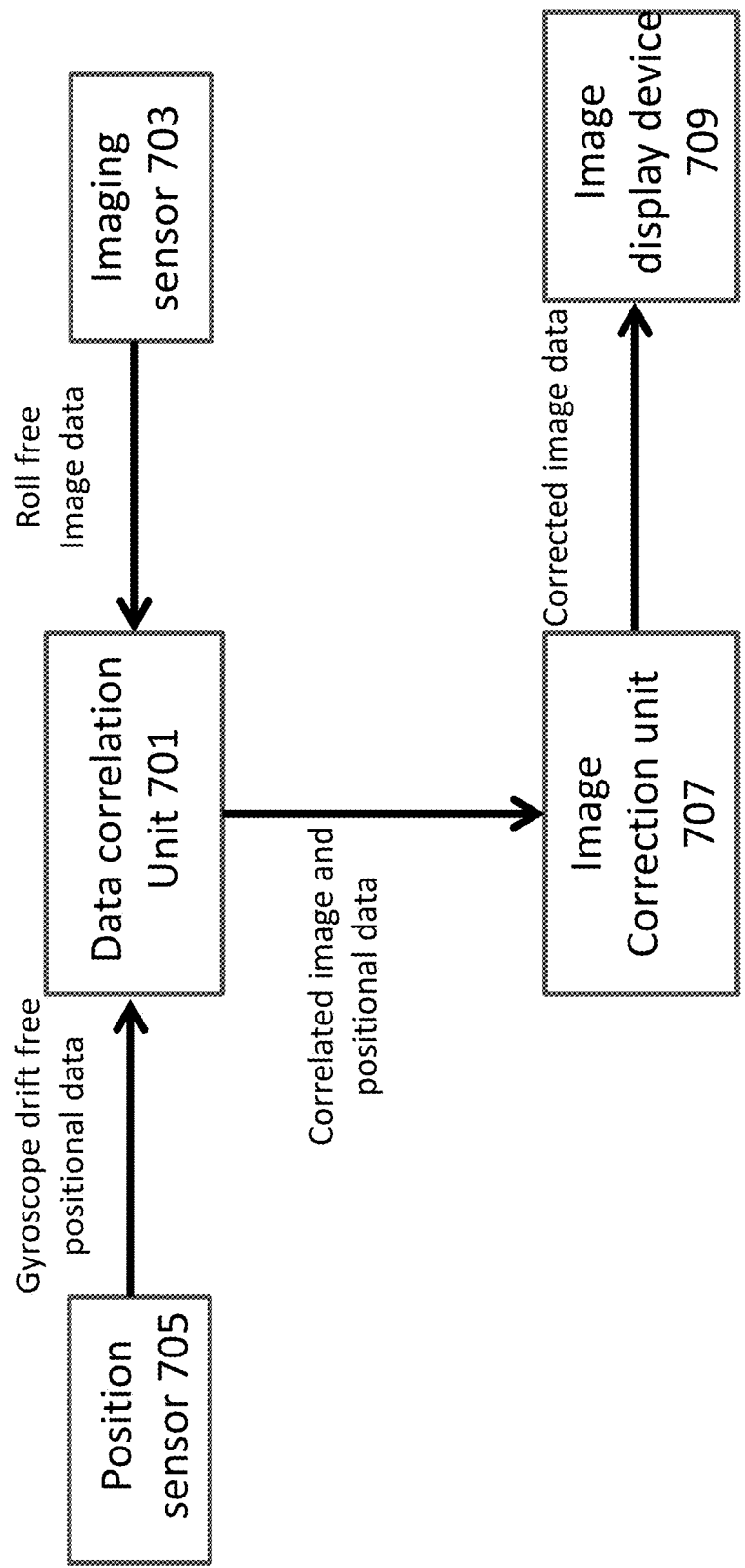
FIG. 7 is a diagram illustrating an exemplary process of image processing corresponding to the example in FIG. 6.

FIG. 7 is a diagram illustrating an exemplary process of image processing corresponding to the example in FIG. 6. As shown in FIG. 7, a data correlation unit 701 and image correction unit 707 may correspond to the one or more processors 604 in FIG. 6. The data correlation unit 701 may receive one or more sets of image data and one or more sets of positional data from an imaging sensor 703 (corresponding to imaging sensor 613 in FIG. 6) and one or more positional sensors 705 respectively. In some embodiments, the output image data from the imaging sensor may be stabilized in terms of roll axis rotation. The roll axis stabilization may be accomplished by utilizing a stabilizing unit. In some embodiments, the positional data may be processed by a filter such that the data is free of gyroscope drift, wherein the filter may be a complimentary filter or any suitable filter as described previously herein. Subsequently, the data correlation unit may correlate the image data and positional data based on image timestamps and position timestamps and output the correlated data to image correction unit 707 for image processing.

The image correction unit 707 may be configured to process image data based on a spatial correction data. As described previously, a synthetic orientation of the imaging sensor may be generated for image data correction. In some embodiments, the imaging sensor may comprise a rolling shutter, in this case, an individual set of image data refer to a group of pixels (e.g., a row or a portion of an image frame) and the synthetic orientation may refer to a synthetic global shutter camera with a smoothed rotation motion correspond to the rolling shutter. In some embodiments, the synthetic orientation may be generated based on the positional data correlated with initial group of pixels in an image frame. In some instances, a low-pass filter may be applied to generate a smoothed synthetic orientation. Further, a transformation matrix may be utilized to correct rolling shutter effect and stabilize the image data. In some embodiments, the transformation matrix may be calculated based on the synthetic orientation and the positional data correlated with each individual image data such that the image data are corrected as described in FIGS. 4 and 5. In some embodiments, the spatial correction data may refer to the transformation matrix.

In other embodiments, the imaging sensor may comprise a global shutter, in this case, an individual set of image data refer to a whole image frame and the synthetic orientation may refer to a synthetic camera with a smoothed rotation motion. In some embodiments, the synthetic orientation may be generated based on the positional data correlated with a whole image frame. In some instances, a low-pass filter may be applied to generate a smoothed synthetic orientation. Further, a transformation matrix may be utilized to stabilize the image data. In some embodiments, the transformation matrix may be calculated based on the synthetic orientation and the positional data correlated with each individual image data. Once the image data are corrected, the image correction unit 707 may output the processed image data to an image display device, or a storage device, or a wireless module 709.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An image processing method comprising:
obtaining one or more sets of image data generated by an imaging sensor, wherein an individual set of image data of the one or more sets of image data is associated with an image timestamp based on a time at which the individual set of image data was generated;
obtaining one or more sets of positional data generated by one or more positional sensors configured to measure positional state of the imaging sensor, wherein an individual set of positional data of the one or more sets of positional data is associated with a positional timestamp based on a time at which the individual set of positional data was generated; and
correlating, with aid of one or more processors, one of the one or more sets of image data with a corresponding one of the one or more sets of positional data based on an image timestamp associated with the one of the one or more sets of image data and a positional timestamp associated with the corresponding one of the one or more sets of positional data;
wherein a rotational movement of the imaging sensor about a single axis is controlled by a stabilizing unit,
wherein the corresponding one of the one or more sets of positional data correlated with the one of the one or more sets of image data is indicative of a positional state of the imaging sensor while capturing the one of the one or more sets of image data,
wherein the method further comprises:
correcting the one of the one or more sets of image data based on the corresponding one of the one or more sets of positional data correlated with the one of the one or more sets of image data,
determining a set of spatial correction data of the imaging sensor about one or more rotational axes by:
applying one or more filters to the corresponding one of the one or more sets of positional data correlated with the one of the one or more sets of image data to generate a set of filtered data; and
comparing the corresponding one of the one or more sets of positional data with the set of filtered data to generate the set of spatial correction data; and
correcting the one of the one or more sets of image data using the set of spatial correction data based on a transformation relationship between a motion of the imaging sensor and changes to the one of the one or more sets of image data.

2. The method of claim 1, wherein the image timestamp associated with the individual set of image data is generated by the imaging sensor and is indicative of a time at which the individual set of image data is captured by the imaging sensor.

3. The method of claim 1, wherein the positional timestamp associated with the individual set of positional data is generated by the one or more positional sensors and is indicative of a time at which the individual set of positional data is measured by the one or more positional sensors.

4. The method of claim 1, wherein the one or more positional sensors comprise a gyroscope and an accelerometer, and the one or more sets of positional data comprise a set of gyroscope data measured by the gyroscope and a set of accelerometer data measured by the accelerometer.

5. The method of claim 4, further comprising:
correlating, with aid of one or more processors, the one of the one or more sets of image data with the set of gyroscope data and the set of accelerometer data based on the image timestamp and the positional timestamps associated with the set of gyroscope data and the set of accelerometer data.

6. The method of claim 1, wherein the image timestamp associated with the individual set of image data is indicative of a time at which the individual set of image data is received by the one or more processors.

7. The method of claim 6, further comprising:
generating, with aid of the one or more processors, the image timestamp.

8. The method of claim 1, wherein the positional timestamp associated with the individual positional data is indicative of a time at which the individual set of positional data is received by the one or more processors.

9. The method of claim 8, further comprising:
generating, with aid of the one or more processors, the positional timestamp.

10. The method of claim 1, wherein:
the image timestamp associated with the individual image data is indicative of a time at which the individual set of image data is received by the one or more processors;
the positional timestamp associated with the individual positional data is indicative of a time at which the individual set of positional data is received by the one or more processors; and
a time bias between the image timestamp for the set of image data and the positional timestamp for the correlated set of positional data is constant.

11. The method of claim 1, further comprising:
eliminating gyroscope drift errors by applying a filter to the one or more sets of positional data;
wherein the one or more sets of positional data comprise at least one of a set of gyroscope data, a set of accelerometer data, or a set of compass data.

12. The method of claim 1, wherein the imaging sensor, the one or more processors, and the one or more positional sensors are on-board a payload supported by a movable object.

13. An apparatus for image processing comprising:
one or more processors; and
a non-transitory computer readable medium storing program instructions that, when executed by the one or more processors, cause the one or more processors to individually or collectively:
   obtain one or more sets of image data derived from an imaging sensor, wherein an individual set of image data of the one or more sets of image data is associated with an image timestamp based on a time at which the individual set of image data was derived;
   obtain one or more sets of positional data derived from one or more positional sensors configured to measure positional state of the imaging sensor, wherein an individual set of positional data of the one or more sets of positional data is associated with a positional timestamp based on a time at which the individual set of positional data was derived; and
   correlate, with aid of one or more processors, one of the one or more sets of image data with a corresponding one of the one or more sets of positional data based on an image timestamp associated with the one of the one or more sets of image data and a positional timestamp associated with the corresponding one of the one or more sets of positional data;
   wherein a rotational movement of the imaging sensor about a single axis is controlled by a stabilizing unit,
   wherein the corresponding one of the one or more sets of positional data correlated with the one of the one or more sets of image data is indicative of a positional state of the imaging sensor while capturing the one of the one or more sets of image data,
wherein the one or more processors are further configured to:
   correct the one correcting the one of the one or more sets of image data based on the corresponding one of the one or more sets of positional data correlated with the one of the one or more sets of image data,
   determine a set of spatial correction data of the imaging sensor about one or more rotational axes by:
      apply one or more filters to the corresponding one of the one or more sets of positional data correlated with the one of the one or more sets of image data to generate a set of filtered data; and
      compare the corresponding one of the one or more sets of positional data with the set of filtered data to generate the set of spatial correction data; and
   correct the one of the one or more sets of image data using the set of spatial correction data based on a transformation relationship between a motion of the imaging sensor and changes to the one of the one or more sets of image data.

14. The apparatus of claim 13, wherein the image timestamp associated with the individual set of image data is generated by the imaging sensor and is indicative of a time at which the individual set of image data is captured by the imaging sensor.

15. The apparatus of claim 13, wherein the positional timestamp associated with the individual set of positional data is generated by the one or more positional sensors and is indicative of a time at which the individual set of positional data is measured by the one or more positional sensors.

16. The apparatus of claim 13, wherein the one or more positional sensors comprise a gyroscope and an accelerometer, and the one or more sets of positional data comprise a set of gyroscope data measured by the gyroscope and a set of accelerometer data measured by the accelerometer.

17. The apparatus of claim 16, wherein the program instructions further cause the one or more processors to:
   correlate the one of the one or more sets of image data with the set of gyroscope data and the set of accelerometer data based on the image timestamp and the positional timestamps associated with the set of gyroscope data and the set of accelerometer data.

* * * * *